United States Patent
Watariuchi

(10) Patent No.: US 8,526,042 B2
(45) Date of Patent: Sep. 3, 2013

(54) INFORMATION PROCESSING APPARATUS AND INFORMATION PROCESSING APPARATUS CONTROL METHOD TO PROVIDE RECOVERY PROCESSES

(75) Inventor: Satoki Watariuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 12/847,794

(22) Filed: Jul. 30, 2010

(65) Prior Publication Data
US 2011/0035619 A1 Feb. 10, 2011

(30) Foreign Application Priority Data
Aug. 4, 2009 (JP) .................................. 2009-181180

(51) Int. Cl.
*G06F 3/12* (2006.01)
(52) U.S. Cl.
USPC .............. 358/1.15; 358/1.14; 714/2; 714/4.1; 714/4.12; 714/4.2; 714/5.1; 709/223; 709/224; 709/226; 709/229; 710/18; 710/29; 710/38; 710/268
(58) Field of Classification Search
USPC ......... 358/1.13–1.16; 709/223–229; 710/17, 710/18, 19, 29, 38, 267, 268; 714/2, 4.1, 714/4.12, 4.2, 5.1
See application file for complete search history.

(56) References Cited

U.S. PATENT DOCUMENTS

| | | | | |
|---|---|---|---|---|
| 7,580,943 B2 * | 8/2009 | Sakura et al. | ......................... | 1/1 |
| 7,821,662 B2 * | 10/2010 | Matsueda | ..................... | 358/1.15 |
| 7,864,346 B2 * | 1/2011 | Ryan et al. | .................... | 358/1.12 |
| 8,085,420 B2 * | 12/2011 | Nemoto et al. | .............. | 358/1.15 |
| 8,363,242 B2 * | 1/2013 | Watariuchi | .................... | 358/1.14 |
| 2005/0105135 A1 * | 5/2005 | Takahashi | ..................... | 358/1.18 |
| 2005/0248804 A1 * | 11/2005 | Goel et al. | ................... | 358/1.15 |
| 2005/0267797 A1 * | 12/2005 | Takahashi et al. | .............. | 705/11 |
| 2006/0197977 A1 * | 9/2006 | Miyata | ......................... | 358/1.15 |
| 2006/0256360 A1 * | 11/2006 | Kayama | ....................... | 358/1.13 |
| 2007/0136117 A1 * | 6/2007 | Matsueda | ......................... | 705/7 |

FOREIGN PATENT DOCUMENTS
JP 2005-242781 A 9/2005

* cited by examiner

*Primary Examiner* — Twyler Haskins
*Assistant Examiner* — Dennis Dicker
(74) *Attorney, Agent, or Firm* — Canon USA, Inc., IP Division

(57) ABSTRACT

An information processing apparatus includes an execution determination unit and a control unit. The execution determination unit determines whether a series of processes including multiple processes is executable at an execution time of the series of processes. The control unit selectively provides at least one recovery device for substituting for the series of processes when it is determined that the series of processes is not executable.

20 Claims, 17 Drawing Sheets

FIG.4A

```
<?xml version="1.0" encoding="UTF-8"?>
<Process id="F1" type="hotfolder" name="PRINT MEETING MATERIALS AT 8 O'CLOCK">
    <Condition>
        <Item type="date">2009-07-01</Item>
        <Item type="time">08:00:00</Item>
        <Item type="file">dirA/MATERIAL 1.img</Item>
        <Item type="file">dirA/MATERIAL 2.img</Item>
        <Item type="file">dirA/MATERIAL 3.img</Item>
    </Condition>
    <Workflow>
        <Job type="read" id="file306">
            <Item type="file">dirA/MATERIAL 1.img</Item>
        </Job>
        <Job type="read" id="file307">
            <Item type="file">dirA/MATERIAL 2.img</Item>
        </Job>
        <Job type="read" id="file308">
            <Item type="file">dirA/MATERIAL 3.img</Item>
        </Job>
        <Job type="combine" id="all_file">
            <Item type="target" no="1">file306</Item>
            <Item type="target" no="2">file307</Item>
            <Item type="target" no="3">file308</Item>
        </Job>
        <Job type="print">
            <Item type="target">all_file</Item>
            <Item type="color">color</Item>
            <Item type="copies">5</Item>
            <Item type="staple">TopLeft</Item>
        </Job>
    </Workflow>
</Process>
```

FIG.4B

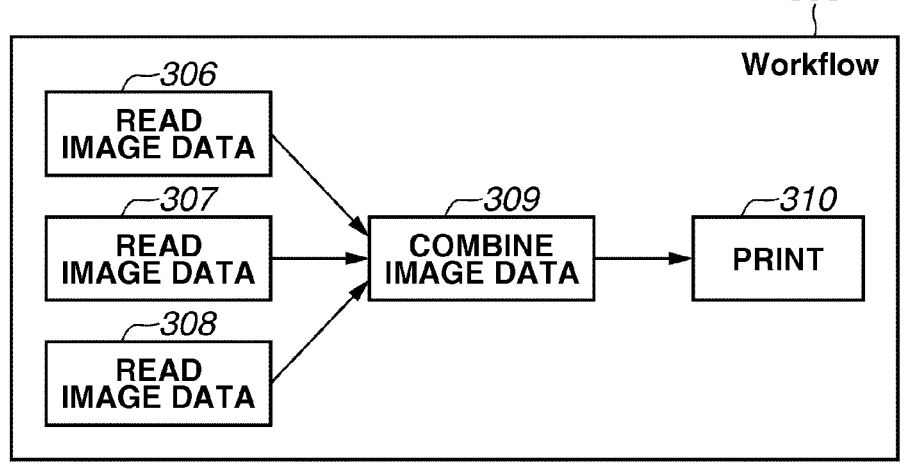

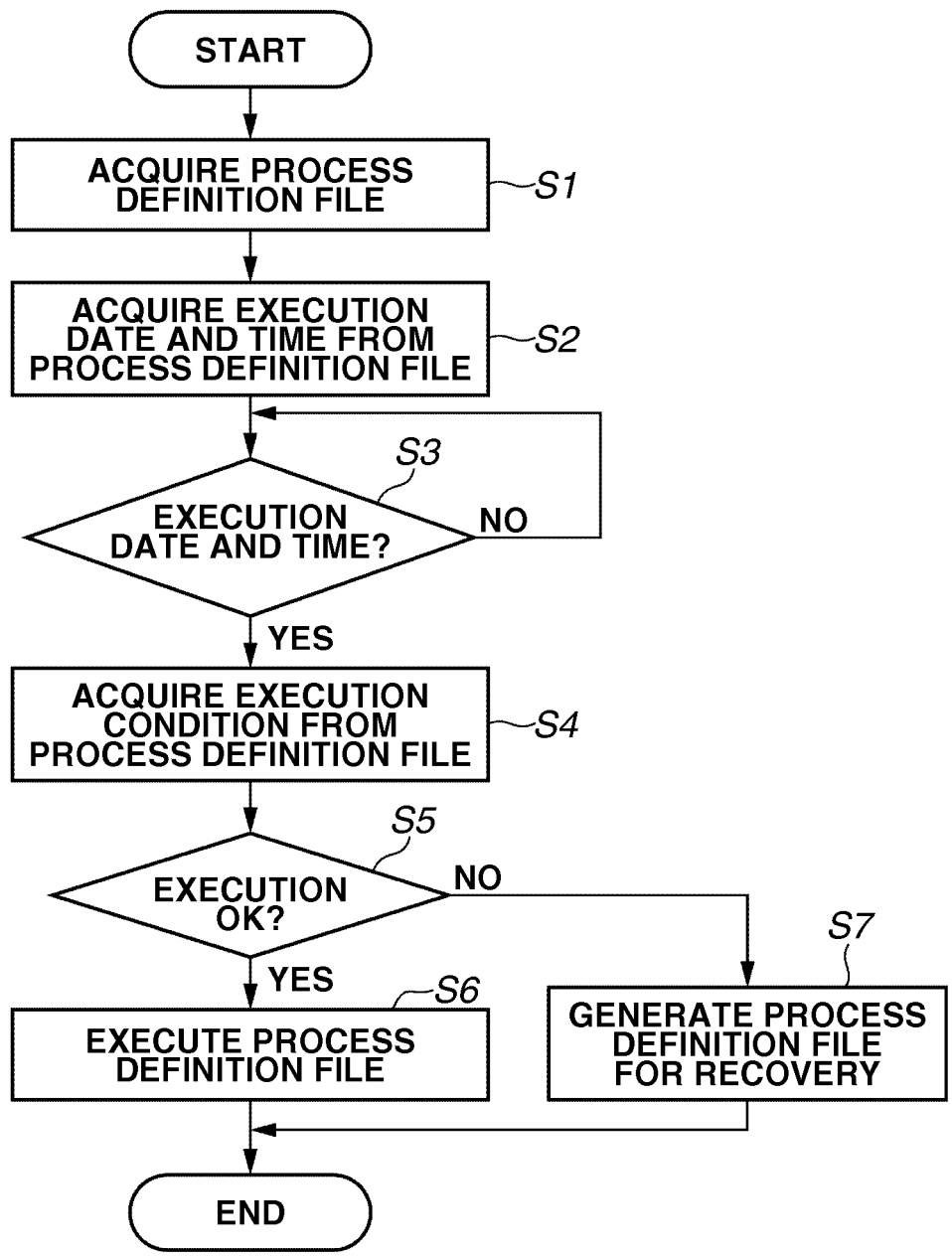

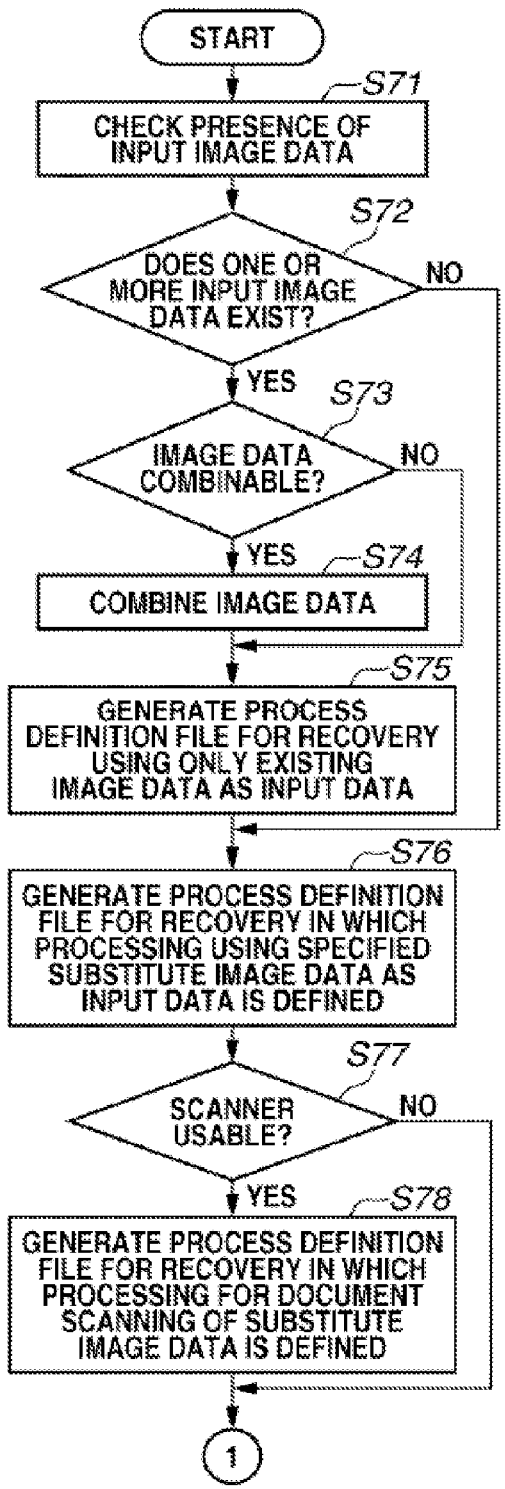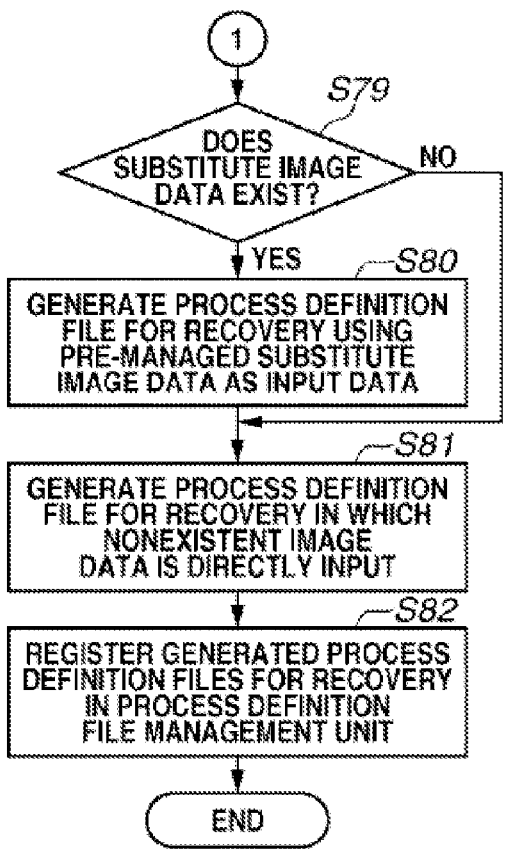

FIG.7A

```
<?xml version="1.0" encoding="UTF-8"?>
<Process id="F2" type="display" name="PRINT MEETING MATERIALS (ONLY MATERIALS 1 AND 2)" recovery="F1">
  <Workflow>
    <Job type="read" id="file403">
      <Item type="file">dirX/MATERIALS 1_2.img</Item>
    </Job>
    <Job type="print">
      <Item type="target">file403</Item>
      <Item type="color">color</Item>
      <Item type="copies">5</Item>
      <Item type="staple">TopLeft</Item>
    </Job>
  </Workflow>
</Process>
```

401 — `<?xml version="1.0" encoding="UTF-8"?>`
402 — `<Workflow>`
403 — `<Job type="read" id="file403">`
404 — `<Job type="print">`

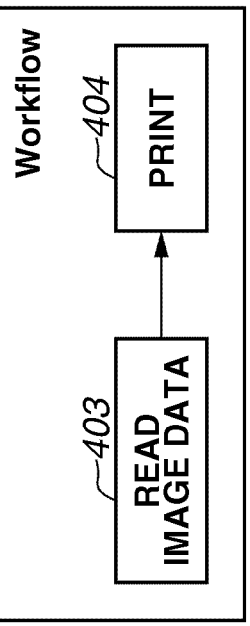

402 Workflow
403 READ IMAGE DATA
404 PRINT

FIG. 8A

```xml
<?xml version="1.0" encoding="UTF-8"?>
<Process id="F3" type="display" name="PRINT MEETING MATERIALS (SELECT MATERIAL 3)" recovery="F1">
  <Workflow>
    <Job type="read" id="file403">
      <Item type="file">dirX/MATERIALS 1_2.img</Item>
    </Job>
    <Job type="select" id="file503">
      <Item type="dialog">dirB</Item>
    </Job>
    <Job type="combine" id="all_file">
      <Item type="target" no="1">file403</Item>
      <Item type="target" no="2">file503</Item>
    </Job>
    <Job type="print">
      <Item type="target">all_file</Item>
      <Item type="color">color</Item>
      <Item type="copies">5</Item>
      <Item type="staple">TopLeft</Item>
    </Job>
  </Workflow>
</Process>
```

F3

501 — `<?xml version...`
502 — `<Workflow>`
403 — `<Job type="read"...`
503 — `<Job type="select"...`
504 — `<Job type="combine"...`
505 — `<Job type="print"...`

FIG. 8B

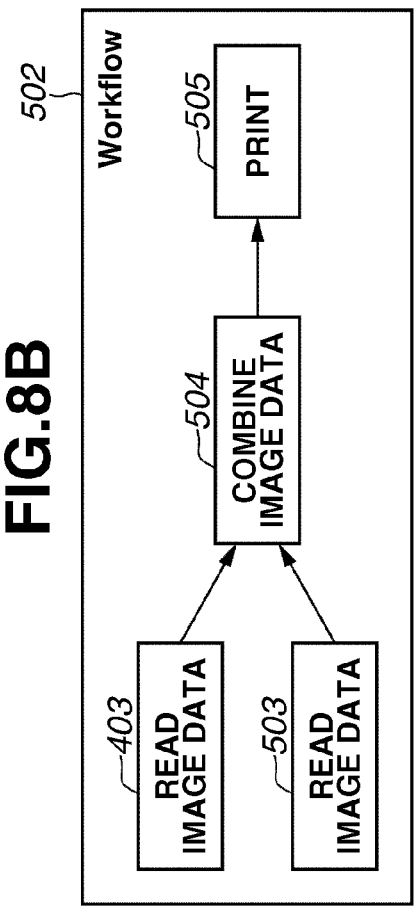

FIG.9A

```
<?xml version="1.0" encoding="UTF-8"?>
<Process id="F4" type="display" name="PRINT MEETING MATERIALS (SCAN MATERIAL 3)" recovery="F1">
  <Workflow>
    <Job type="read" id="file403">
      <Item type="file">dirX/MATERIALS 1_2.img</Item>
    </Job>
    <Job type="scan" id="file603">
      <Item type="color">color</Item>
    </Job>
    <Job type="combine" id="all_file">
      <Item type="target" no="1">file403</Item>
      <Item type="target" no="2">file603</Item>
    </Job>
    <Job type="print">
      <Item type="target">all_file</Item>
      <Item type="color">color</Item>
      <Item type="copies">5</Item>
      <Item type="staple">TopLeft</Item>
    </Job>
  </Workflow>
</Process>
```

601 602 403 603 604 605        F4

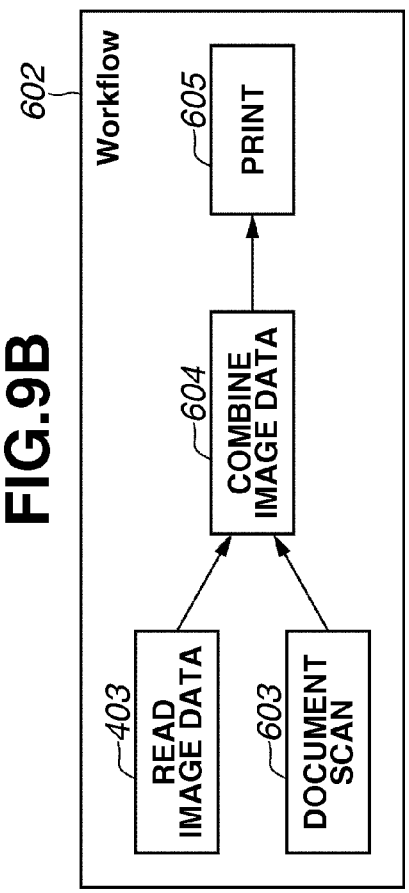

```
<?xml version="1.0" encoding="UTF-8"?>
<Process id="F5" type="display" name="PRINT MEETING MATERIALS (MATERIAL 3 IS SUBSTITUTE IMAGE)" recovery="F1">
  <Workflow>
    <Job type="read" id="file403">
      <Item type="file">dirX/MATERIALS 1_2.img</Item>
    </Job>
    <Job type="read" id="file703">
      <Item type="dialog">dirC/SUBSTITUTE IMAGE DATA.img</Item>
    </Job>
    <Job type="combine" id="all_file">
      <Item type="target" no="1">file403</Item>
      <Item type="target" no="2">file703</Item>
    </Job>
    <Job type="print">
      <Item type="target">all_file</Item>
      <Item type="color">color</Item>
      <Item type="copies">5</Item>
      <Item type="staple">TopLeft</Item>
    </Job>
  </Workflow>
</Process>
```

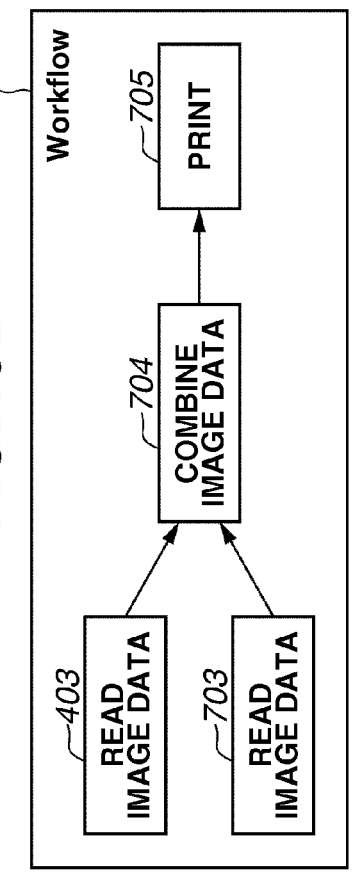

702 Workflow
403 READ IMAGE DATA
703 READ IMAGE DATA
704 COMBINE IMAGE DATA
705 PRINT

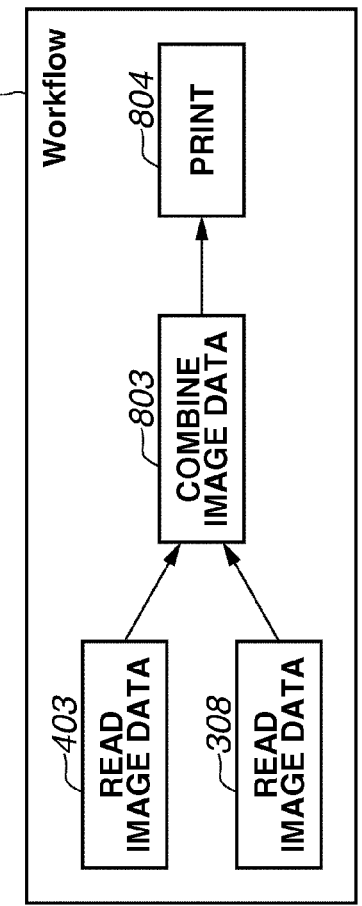

FIG. 14A

```
<?xml version="1.0" encoding="UTF-8"?>
<Process id="F7" type="hotfolder"
name="PRINT MEETING MATERIALS (ONLY MATERIALS 1 AND 2)" recovery="F1">
    <Condition>
        <Item type="file">dirA/PRINT MEETING MATERIALS (ONLY MATERIALS 1 AND 2)/*</Item>
    </Condition>
    <Workflow>
        <Job type="read" id="file403">
            <Item type="file">dirX/MATERIALS 1_2.img</Item>
        </Job>
        <Job type="print">
            <Item type="target">file403</Item>
            <Item type="color">color</Item>
            <Item type="copies">5</Item>
            <Item type="staple">TopLeft</Item>
        </Job>
    </Workflow>
</Process>
```

901 — `<?xml version...`
902 — `<Condition>`
903 — `</Condition>`
402 — `<Workflow>`
403 — `<Job type="read"...`
404 — `<Job type="print">`

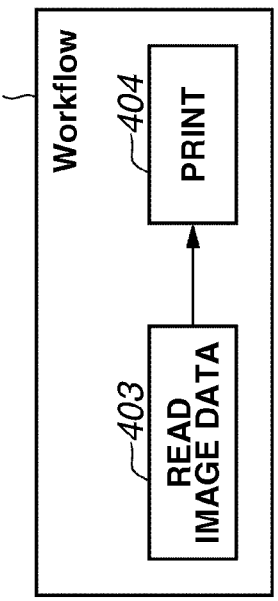

Workflow 402
403 READ IMAGE DATA → 404 PRINT

FIG.15A

```
<?xml version="1.0" encoding="UTF-8"?>
<Process id="F8" type="hotfolder"
name="PRINT MEETING MATERIALS (MATERIAL 3 IS SUBSTITUTE IMAGE)" recovery="F1">
    <Condition>
        <Item type="file">dirA/PRINT MEETING MATERIALS (MATERIAL 3 IS SUBSTITUTE IMAGE)/*</Item>
    </Condition>
    <Workflow>
        <Job type="read" id="file403">
            <Item type="file">dirX/MATERIALS 1_2.img</Item>
        </Job>
        <Job type="read" id="file703">
            <Item type="file">dirC/SUBSTITUTE IMAGE DATA.img</Item>
        </Job>
        <Job type="combine" id="all_file">
            <Item type="target" no="1">file403</Item>
            <Item type="target" no="2">file703</Item>
        </Job>
        <Job type="print">
            <Item type="target">all_file</Item>
            <Item type="color">color</Item>
            <Item type="copies">5</Item>
            <Item type="staple">TopLeft</Item>
        </Job>
    </Workflow>
</Process>
```

Labels: 1001, 1002, 1003, 702, 403, 703, 704, 705; F8

FIG.15B

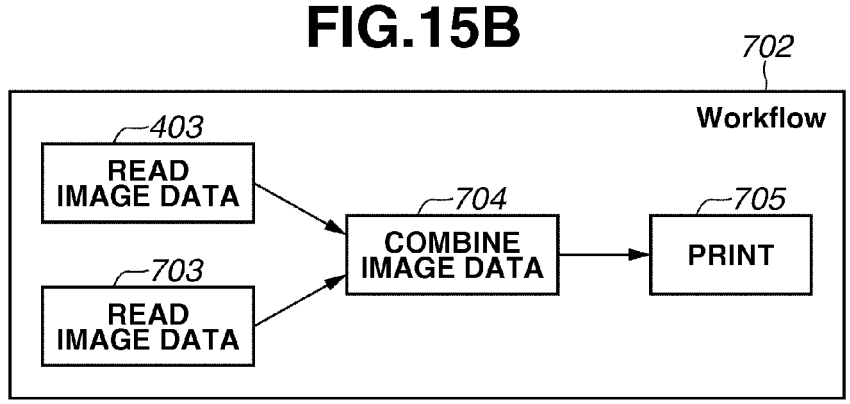

FIG.16A

```
<?xml version="1.0" encoding="UTF-8"?>
<Process id="F9" type="hotfolder"
name="PRINT MEETING MATERIALS (STORE MATERIAL 3 IN HOT FOLDER)" recovery="F1">
    <Condition>
        <Item type="file">dirA/PRINT MEETING MATERIALS (PLEASE STORE MATERIAL 3)/*.img</Item>
    </Condition>
    <Workflow>
        <Job type="read" id="file403">
            <Item type="file">dirX/MATERIALS 1_2.img</Item>
        </Job>
        <Job type="read" id="file1105">
            <Item type="file">dirA/PRINT MEETING MATERIALS (PLEASE STORE MATERIAL 3)/*.img</Item>
        </Job>
        <Job type="combine" id="all_file">
            <Item type="target" no="1">file403</Item>
            <Item type="target" no="2">file1105</Item>
        </Job>
        <Job type="print">
            <Item type="target">all_file</Item>
            <Item type="color">color</Item>
            <Item type="copies">5</Item>
            <Item type="staple">TopLeft</Item>
        </Job>
    </Workflow>
</Process>
```

FIG.16B

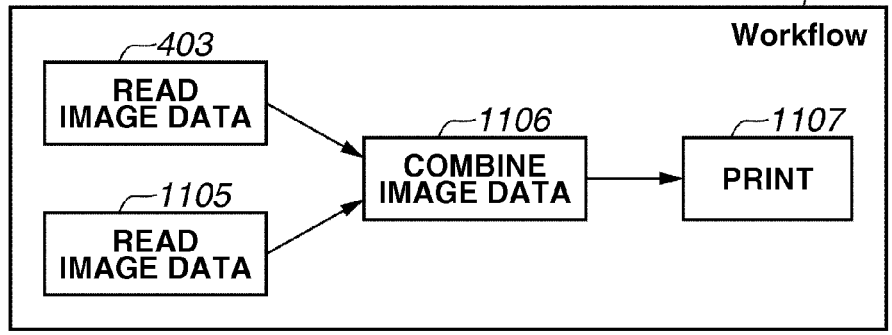

INFORMATION PROCESSING APPARATUS AND INFORMATION PROCESSING APPARATUS CONTROL METHOD TO PROVIDE RECOVERY PROCESSES

BACKGROUND OF THE INVENTION

1. Field of the Invention

The present invention relates to an information processing apparatus, an information processing apparatus control method, and a computer program.

2. Description of the Related Art

As an image processing apparatus, a multifunction peripheral including a scanner, a facsimile, a printer, and the like has been proposed. Usually, a multifunction peripheral includes a storage device for storing image data. Further, functions (box functions) for storing in the storage device data input by various methods, such as by document scanning by the scanner, and image data reception from a computer connected via a network, are generally known. An application in the multifunction peripheral may utilize the image data stored in a box directly or after the image data is edited. For example, this image data may be moved to another box, or combined with other pieces of image data and bound into a book and printed. Alternatively, the image data may be compressed and then sent via electronic mail. During such operations, sometimes several functions need to be combined, or detailed settings need to be performed. Therefore, currently, the idea of employing a hot folder for the boxes is being investigated. In an information processing apparatus such as a personal computer, a hot folder is a function that enables image data to be automatically printed based on a setting file (process definition file) pre-associated with a predetermined folder just by storing image data in the folder. When image data is stored in the hot folder, the utilized hot folder acts as a trigger that enables a series of processes to be executed, such as a workflow defined by the process definition file associated with the hot folder.

A multifunction peripheral has several functions, including electronic mail sending of image data and copying and movement of image data. By registering processes other than printing as the process definition file, such functions of a multifunction peripheral can be executed. The processing does not have to be performed immediately. For example, by specifying the execution date and time in the process definition file, the processing can be executed at the specified execution date and time, even if image data is stored in the folder. The specified execution date and time can designate a one time only execution, or a periodic execution. Further, the image data to be processed can be specified as a single piece of image data or several pieces of image data. Therefore, for example, for a meeting held every Monday at 10 a.m., a setting can be performed that combines three pieces of image data at 9 a.m. every Monday, and executes printing of the combined data as a meeting material.

Japanese Patent Application Laid-Open No. 2005-242781 discusses a printing control method that generates a setting file for a print file to be stored in a folder, and sets the setting file in the folder. Further, when this printing control method detects that a print file is imported into the folder, the method adds and transfers this setting file to the imported print file.

In conventional technology for performing a series of processes utilizing a hot folder in which the execution date and time is specified, the processing sometimes cannot be executed, even though the execution date and time has arrived. For example, when the image data to be processed does not exist in the predetermined folder or is insufficient, the processing cannot be executed even though the execution date and time has arrived. Even if the user subsequently stores the image data in the predetermined folder after the execution date and time has passed, the processing of the process definition file associated with the hot folder is not executed because the execution date and time has passed. To execute a desired process, either the execution time and date of the process definition file associated with the hot folder has to be changed, or the user manually has to execute the processes in the order described in the process definition file. For the user, this is inconvenient.

SUMMARY OF THE INVENTION

The present invention is directed to an information processing apparatus that selectively provides recovery devices that allow a user to substitute for a series of processes when a series of processes cannot be executed during execution of that series of processes.

According to an aspect of the present invention, an information processing apparatus includes an execution determination unit and a control unit. The execution determination unit determines whether a series of processes including multiple processes is executable at an execution time of the series of processes. The control unit selectively provides at least one recovery device for substituting for the series of processes when it is determined that the series of processes is not executable.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B illustrate an example of a process definition file and a workflow.

FIG. 5 illustrates an example of an execution processing flow of a process definition file according to an exemplary embodiment.

FIGS. 6A and 6B illustrate a generation processing flow of a recovery process definition file.

FIGS. 7A and 7B illustrate an example of a recovery process definition file and a workflow.

FIGS. 8A and 8B illustrate an example of a recovery process definition file and a workflow.

FIGS. 9A and 9B illustrate an example of a recovery process definition file and a workflow.

FIGS. 10A and 10B illustrate an example of a recovery process definition file and a workflow.

FIGS. 11A and 11B illustrate an example of a recovery process definition file and a workflow.

FIGS. 14A and 14B illustrate an example of a recovery process definition file and a workflow.

FIGS. 15A and 15B illustrate an example of a recovery process definition file and a workflow.

FIGS. 16A and 16B illustrate an example of a recovery process definition file and a workflow.

DESCRIPTION OF THE EMBODIMENTS

Various exemplary embodiments, features, and aspects of the invention will be described in detail below with reference to the drawings.

Figure 1A:
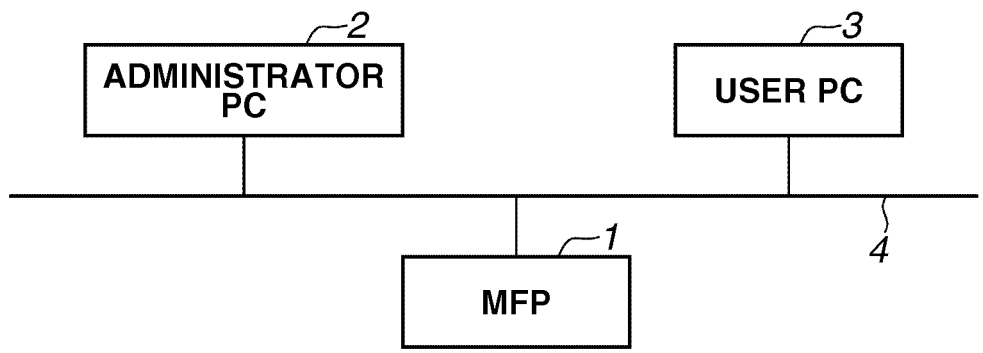
FIGS. 1A and 1B illustrate an example of a configuration of an information processing system and a configuration of a multifunction peripheral (MFP) according to an exemplary embodiment of the present invention.
Figure 1B:
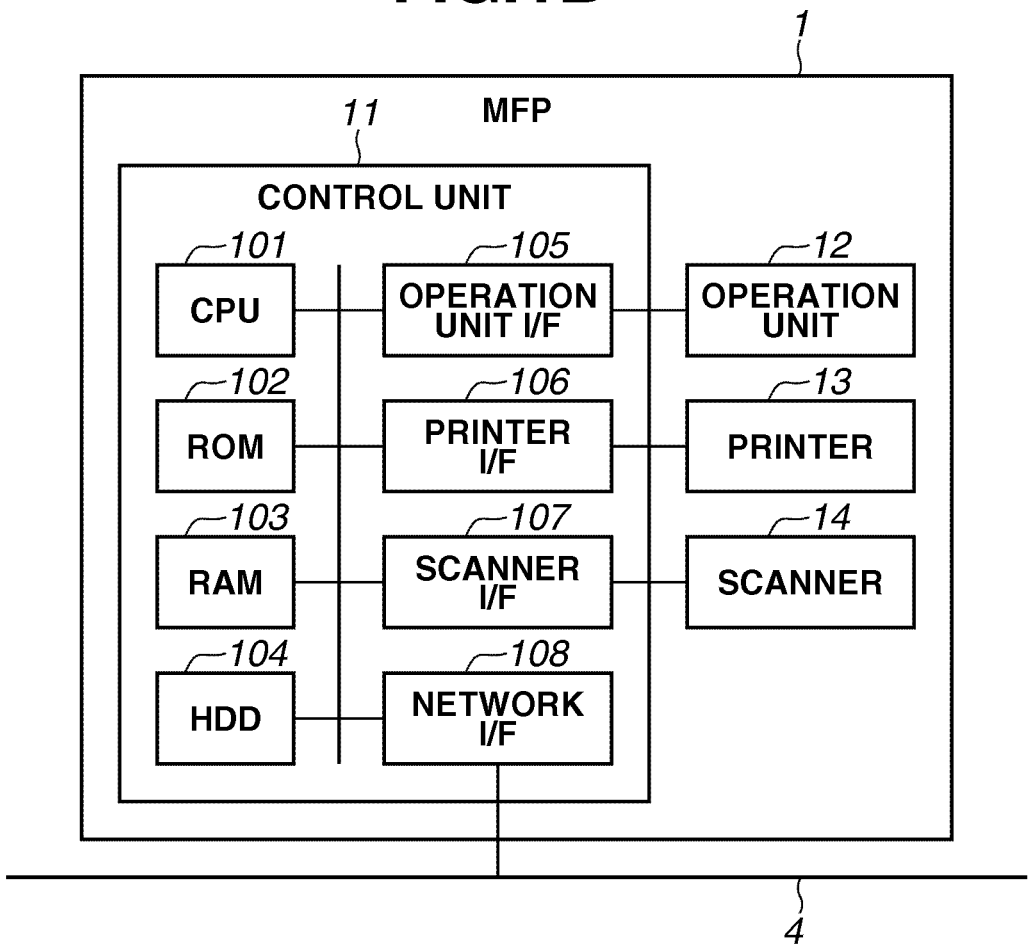

FIGS. 1A and 1B illustrate an example of a configuration of an information processing system and a configuration of a multifunction peripheral (MFP) according to an exemplary embodiment of the present invention. The configurations illustrated in FIGS. 1A and 1B can be applied to both a first and a second exemplary embodiment according to the present invention. FIG. 1A illustrates an example of a configuration of an information processing system according to the present exemplary embodiment. This information processing system includes an MFP 1, an administrator personal computer (PC) 2, and a user PC 3. A local area network (LAN) 4 connects the MFP 1, the administrator PC 2, and the user PC 3 so that they can communicate with each other.

The MFP 1 is an example of an information processing apparatus. A process definition file is a definition file that defines a series of processes including several processes executed by the MFP 1, and the execution condition of the series of processes. A recovery process definition file is a definition file that defines substitute processing that takes the place of a series of processes when the execution condition of that series of processes is not satisfied. A recovery process definition file is a process definition file for recovery. In the present exemplary embodiment, the MFP 1 opens a hot folder on the LAN 4. The administrator PC 2 displays a screen for generating a process definition file. When the system administrator inputs various processing contents (document scan parameters, print settings, etc.) via this screen, the administrator PC 2 generates a process definition file. The administrator PC 2 sends the generated process definition file to the MFP 1 via the LAN 4. Based on an operation input from the user, the user PC 3 sends to the MFP 1 image data that is to be stored in the opened hot folder. The MFP 1 selectively may provide to a user at least one recovery device for substituting for a series of processes when a series of processes cannot be executed during execution of that series of processes. For example, if the MFP 1 receives from the administrator PC 2 a process definition file that cannot be executed, the MFP 1 generates one or more recovery process definition files that allow a user to continue the processing with recovery process definition files. Here, the one or more recovery process definition files substitute for the non-executable process definition file FIG. 1B illustrates a hardware configuration example of the MFP 1. The MFP 1 includes a control unit 11, an operation unit 12, a printer 13, and a scanner 14. The control unit 11 controls the operations of the whole MFP 1. The operation unit 12 inputs operation input information based on an operation input from the user. The operation unit 12 is provided with a liquid crystal display unit having a touch panel function, a keyboard, and the like. The printer 13 receives image data from the control unit 11 and performs print processing of that image data. The scanner 14 generates image data by reading an image on a document based on an instruction from the control unit 11, and returns the generated image data to the control unit 11. The control unit 11 includes a central processing unit (CPU) 101, a read-only memory (ROM) 102, and a random access memory (RAM) 103. Further, the control unit 11 includes a hard disk drive (HDD) 104, an operation interface (I/F) 105, a printer I/F 106, a scanner I/F 107, and a network I/F 108. The CPU 101 reads a control program stored in the ROM 102, and executes various control processes such as reading control and sending control. The ROM 102 may be a computer-readable medium having stored thereon, a control program that causes an information processing apparatus to perform a control method according to an exemplary embodiment. This control program is a computer program that executes the information processing apparatus control method according to the present exemplary embodiment. The RAM 103 is used as a temporary storage area for a main memory, a work area, and the like of the CPU 101. The HDD 104 stores image data and various programs.

The operation I/F 105 connects the operation unit 12 and the control unit 11. Operation input information input by the operation unit 12 is sent to the control unit 11 via the operation I/F 105. The printer I/F 106 connects the printer 13 and the control unit 11. Image data to be printed by the printer 13 is transferred from the control unit 11 to the printer 13 via the printer I/F 106, and printed on a recording medium by the printer 13. The scanner I/F 107 connects the scanner 14 and the control unit 11. The scanner 14 generates image data by reading an image on a document, and inputs the generated image data into the control unit 11 via the scanner I/F 107. The network I/F 108 connects the control unit 11 (MFP 1) to the LAN 4. The network I/F 108 sends image data to an external apparatus (e.g. user PC 3) on the LAN 4, and opens a hot folder.

Figure 2:
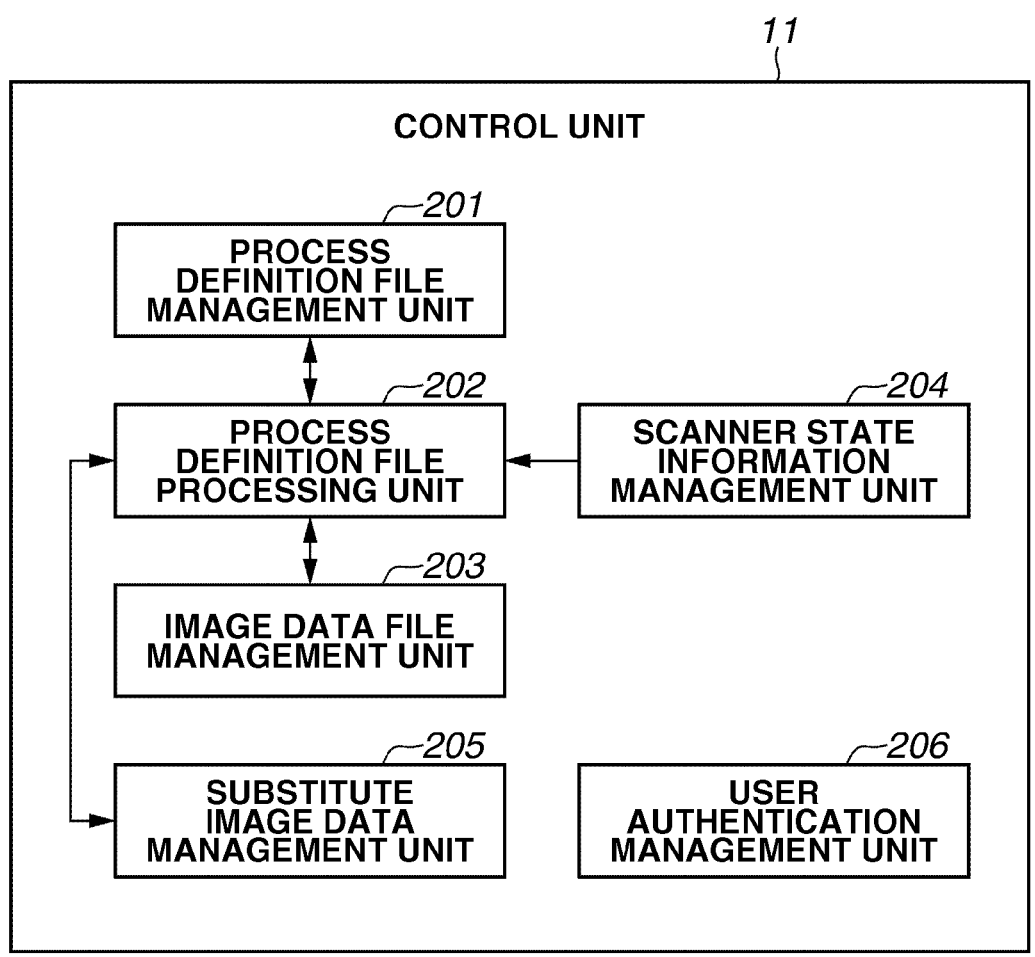
FIG. 2 illustrates an example of a function block diagram of a control unit included in the MFP.

FIG. 2 illustrates an example of a function block diagram of the control unit 11 included in the MFP 1. The CPU 101 illustrated in FIG. 1B executing the control program stored in the ROM 102 realizes the functions of the respective processing units included in the control unit 11, which will be described below.

The control unit 11 includes a process definition file management unit 201, a process definition file processing unit 202, an image data file management unit 203, a scanner state information management unit 204, a substitute image data management unit 205, and a user authentication management unit 206. The process definition file management unit 201 stores and manages in the HDD 104 process definition files received by the MFP 1 from the administrator PC 2 and process definition files generated by the MFP 1. The process definition file processing unit 202 executes the processing defined by the process definition file. The process definition file processing unit 202 performs processing such as, for example, executing the process definition file associated with the hot folder at a specified time, and generating a recovery process definition file based on a process definition file, such as a non-executable process definition file. Further, the process definition file processing unit 202 functions as an execution determination unit for determining whether a series of processes is executable. This determination may be based on the execution condition of the series of processes defined by the process definition file. The process definition file processing unit 202 determines whether the execution condition of the series of processes included in the process definition file associated with a predetermined event is satisfied when that event occurs. The occurrence of this event may be, for example, when the current date and time reaches a predetermined date and time. Further, the process definition file processing unit 202 functions as a control unit for selectively providing a recovery process definition file as a recovery device for substituting for a series of processes when the process definition file processing unit 202 determines that the above series of processes cannot be executed.

If the process definition file processing unit 202 determines that the execution condition is not satisfied, the process definition file processing unit 202 also may generate recovery process definition files and generate recovery hot folders that are associated with each recovery process definition file. In these recovery process definition files, storage of an arbitrary file in the recovery hot folder is defined as a trigger for executing the substitute processing defined by the recovery process definition file.

Further, the process definition file processing unit 202 also may determine whether all of the image data required to execute the processing included in the process definition file and defined by that definition file is stored in a predetermined storage unit, specifically, the HDD 104. More specifically, the process definition file processing unit 202 makes an inquiry to the image data file management unit 203 to determine whether the image data is being managed by the image data file management unit 203 in the HDD 104. If the process definition file processing unit 202 determines that some of the image data is not stored, the process definition file processing unit 202 may generate a recovery process definition file in which processing is defined so that the processing utilizes only the stored image data as input data.

If the process definition file processing unit 202 determines that some data is not stored, the process definition file processing unit 202 also may generate a recovery process definition file in which processing is defined so that the processing utilize substitute image data as input that substitutes for the image data that is not stored. This substitute image data may be substitute image data that is pre-managed by the process definition file management unit 201, or may be substitute image data that is specified by the user. Further, the process definition file processing unit 202 may generate a recovery process definition file that defines document scanning processing to scan the substitute image data, where the substitute image data is substituting for the image data that is not stored in the HDD 104. In addition, the process definition file processing unit 202 may generate a recovery process definition file that defines the image data not stored in the HDD 104 as the input data to be used in processing execution. Consequently, the processing defining this image data as the input data by the recovery process definition file can be executed if this image data is subsequently stored in the HDD 104, even if the image data does not exist at the execution time of the process definition file.

The image data file management unit 203 stores and manages in the HDD 104 image data document-scanned by the scanner 14 (refer to FIG. 1B) and image data stored in a hot folder from an external apparatus via the network I/F 108. The scanner state information management unit 204 manages scanner state information. Scanner state information is information indicating whether the scanner 14 is currently in a usable state. For example, when an error (paper jam, etc.) has occurred in the scanner 14, the scanner state information indicates that the scanner 14 is not in a usable state.

The substitute image data management unit 205 manages substitute image data to be used as a substitute such as when the image data specified by the process definition file does not exist. One substitute image data may be set for the whole of the MFP 1, or multiple pieces may be set. For example, substitute image data may be set for each user or for each process definition file. The substitute image data also may be image data containing a description based on the system state at that point in time, such as "required image data does not exist" or "we are closed today". Alternatively, the substitute image data may be like colored paper acting as a mark for subsequent insertion of a printed sheet of paper. The user authentication management unit 206 manages user authentication information, which is information for authenticating the user, and performs user authentication using this user authentication information. The user authentication management unit 206 performs user authentication based on, for example, a verification result between a user identification (ID) read from a user ID card and the user authentication information, or based on a verification result between user biological information and the user authentication information. The information processing apparatus control method according to the present exemplary embodiment is realized by the respective processing units included in the control unit 11 illustrated in FIG. 2.

Figure 3A:
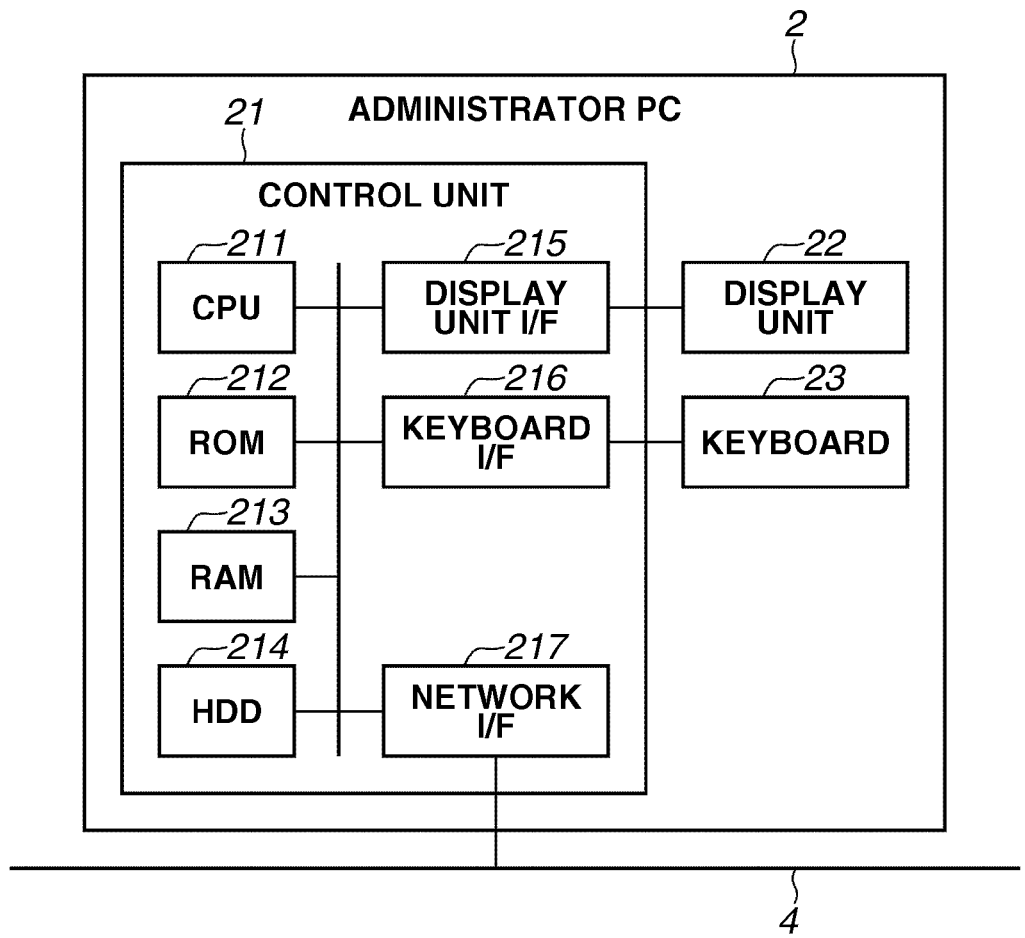
FIGS. 3A and 3B illustrate a hardware configuration example of an administrator PC and an operation example of the overall information processing system.
Figure 3B:
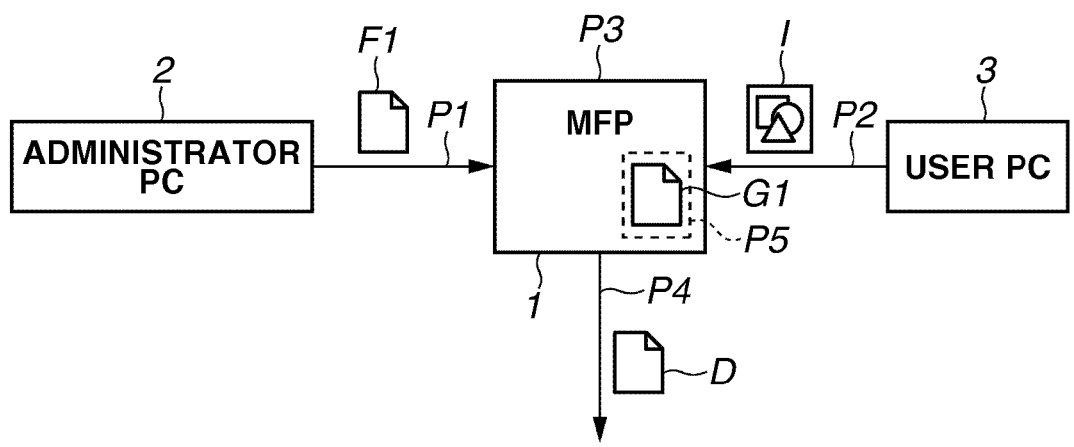

FIGS. 3A and 3B illustrate a hardware configuration example of the administrator PC 2 and an operation example of the overall information processing system according to the present exemplary embodiment. FIG. 3A illustrates a hardware configuration example of the administrator PC 2. The administrator PC 2 includes a control unit 21, a display unit 22, and a keyboard 23. The control unit 21 controls the operations of the whole administrator PC 2. The display unit 22 performs screen display processing based on an instruction from the control unit 21 (of a CPU 211). For example, the display unit 22 displays a process definition file generation screen, which is a screen for inputting the operation input information required to generate a process definition file. The keyboard 23 inputs operation input information based on an operation input from the administrator. The control unit 21 includes a CPU 211, a ROM 212, a RAM 213, an HDD 214, a display I/F 215, a keyboard I/F 216, and a network I/F 217. The CPU 211 reads a program stored in the ROM 212 for controlling the administrator PC 2, and executes various control processing. The RAM 213 is used as a temporary storage area for a main memory, a work area, and the like of the CPU 211. The HDD 214 stores image data and various programs or stores various information tables. The display I/F 215 connects the display unit 22 and the control unit 21. The keyboard I/F 216 connects the keyboard 23 and the control unit 21. The CPU 211 recognizes an instruction from the user based on operation input information input by the keyboard 23, and based on the recognized instruction, causes the screen displayed on the display unit 22 to change. The network I/F 217 connects the control unit 21 (administrator PC 2) to the LAN 4. The network I/F 217 sends information to other apparatuses on the LAN 4 and receives various information from other apparatuses on the LAN 4. Since the user PC 3 has the same configuration as the administrator PC 2, a description of the user PC 3 is not repeated here.

FIG. 3B illustrates an operation example of the overall information processing system according to the present exemplary embodiment. First, the administrator PC 2 generates a process definition file (F1) based on an operation instruction from the administrator. More specifically, the administrator inputs operation input information (document scan parameters, print settings, etc.) via the process definition file generation screen displayed on the administrator PC 2. Then, the CPU 211 of the administrator PC 2 generates the process definition file based in the input operation input information. The administrator PC 2 sends the generated process definition file (F1) to the MFP 1 via the LAN 4 (refer to P1 in FIG. 3B). In this example, it is defined in the process definition file (F1) that multiple image data in a hot folder opened by the MFP 1 on the LAN 4 are to undergo a series of processes of combining at a specified execution date and time and then printing. The process definition file management unit 201 of the MFP 1 receives the process definition file (F1) sent from the administrator PC 2. Then, the process definition file management unit 201 associates and registers the process definition file (F1) with the hot folder, and holds it therein.

Next, based on an operation input from the user, the user PC 3 sends to the MFP 1 image data I, which is to be stored in the hot folder of the MFP 1 (refer to P2 in FIG. 3B). The sent image data I is stored in the hot folder, and stored and managed in the HDD 104 by the image data file management unit 203. When the execution date and time defined in the process definition file (F1) is reached, the process definition file processing unit 202, which has received the image data I, starts the processing defined by the process definition file (F1) (refer to P3 in FIG. 3B). Next, based on the series of processes defined by the process definition file (F1), the process definition file processing unit 202 determines, for example, whether the image data required for execution of the series of processes is all present. For example, the process definition file processing unit 202 makes an inquiry to the image data file management unit 203 whether the required image data exists, and based on the response from the image data file management unit 203, determines whether the image data is all present. If the required image data is all present, based on the defined contents of the process definition file (F1), the process definition file processing unit 202 combines the image data and performs printing of a paper document D (refer to P4 in FIG. 3B). If the required image data is not all present, based on the defined contents of the process definition file (F1), the process definition file processing unit 202 generates at least one recovery process definition file (G1) (refer to P5 in FIG. 3B).

FIGS. 4A and 4B illustrate an example of a process definition file and a workflow defined by the process definition file. FIG. 4A illustrates an example of the process definition file (F1). In FIG. 4A, although an example of a process definition file described in Extensible Markup Language (XML) format is illustrated, the process definition file may be described in other formats. A process tag 301 described in the process definition file (F1) defines the fact that this file is a process definition file. A sublement includes a data element that is a subordinate portion of a composite data element. The respective items relating to the process definition file (F1) are described as subelements of the process tag 301. Further, the following attributes are defined as attributes of the process tag 301. For example, a process ID ("F1" in FIG. 4A) that uniquely identifies the process definition file, the fact that the this file is a process definition file associated with a hot folder (type="hot folder"), and the name of the process ("print meeting materials at 8 o'clock" in FIG. 4A) are defined.

A condition tag 302 defines the execution condition of the process definition file. In the condition tag 302, it is only described that the execution condition is defined. The specific execution condition is described as subelements of the condition tag 302. A tag 303 defines the execution date and time of the process definition file. A tag 304 defines the image data that will be required when executing the process definition file. A workflow tag 305 defines the series of processes executed by this file. In this example, the series of processes is a workflow consisting of a process for reading image data, a process for combining the read image data, and a process for printing the combined image data. Each process is described as a subelement of the workflow tag 305. The order of appearance in the process definition file (F1) indicates the execution order. A tag 306 defines the processing for reading the image data as input data. A subelement of the tag 306 defines the file path (dirA/MATERIAL1.img) of the actually read image data. Similar to the tag 306, a tag 307 defines the processing for reading the image data as input data. A reason why the tags 306 and 307 have the same description is that the read image data is different. A subelement of the tag 307 defines the file path (dirA/MATERIAL2.img) of the actually read image data.

Similar to the tags 306 and 307, a tag 308 defines the processing for reading the image data as input data. A subelement of the tag 308 defines the file path (dirA/MATERIAL3.img) of the actually read image data. A tag 309 is a subelement, which defines the image data to be a combination target. In this example, the tag 309 defines the image data defined by the tags 306, 307, and 308, specifically, the files 306 to 308, as combination targets. A tag 310 defines the processing for printing the image data. The subelements of the tag 310 define the image data serving as a printing target (in this example, the image data combined in the tag 309), a color setting (color), the number of copies to print (5), the staple position (top left), and the like.

FIG. 4B illustrates an example of a workflow defined by the workflow tag 305 of the process definition file (F1). This tag 305 defines a workflow of reading three pieces of image data (tags 306, 307, and 308), combining the read image data (tag 309), and printing the combined image data (tag 310).

FIG. 5 illustrates an example of an execution processing flow of a process definition file according to the present exemplary embodiment. The CPU 101 of the MFP 1 executing a control program realizes each of the processes illustrated by the processing flow of FIG. 5. First, in step S1, the process definition file processing unit 202 of the MFP 1 reads a process definition file managed by the process definition file management unit 201 from the HDD 104 into the RAM 103. The process definition file processing unit 202 only reads the process definition file associated with the hot folder, and does not read the process definition files executed by user operations. Next, in step S2, the process definition file processing unit 202 acquires the execution date and time defined by the condition tag of the read process definition file. Then, in step S3, the process definition file processing unit 202 determines whether the system date and time has reached the execution date and time acquired in step S2. If the process definition file processing unit 202 determines that the system date and time has not reached the execution date and time (NO in step S3), the processing returns to step S3. If the process definition file processing unit 202 determines that the system date and time has reached the execution date and time (YES in step S3), the processing proceeds to step S4. In step S4, the process definition file processing unit 202 acquires the execution condition defined by the condition tag of the process definition file.

Next, in step S5, the process definition file processing unit 202 checks the execution condition acquired in step S4 to determine whether the process definition file is executable. For example, if predetermined image data is specified for the execution condition, the process definition file processing unit 202 determines whether the image data specified in the execution condition is managed by the image data file management unit 203.

If that image data is managed by the image data file management unit 203, the process definition file processing unit 202 determines that the process definition file is executable (YES in step S5). If the process definition file processing unit 202 determines that the process definition file is executable, the processing proceeds to step S6. In step S6, the process definition file processing unit 202 executes the process definition file, specifically, executes the series of processes defined by the process definition file. In step S6, the process definition file processing unit 202 executes processing based on the definition described in the workflow tag of the process definition file.

Using the process definition file (F1) illustrated in FIG. 4A as an example, the process definition file processing unit 202 executes the series of processes of reading the three pieces of image data, combining the read image data, and printing the combined image data.

If the process definition file processing unit 202 determines that the process definition file is not executable (NO in step S5), the process definition file may be deemed a non-executable process definition file and the processing proceeds to step S7. In step S7, the process definition file processing unit 202 generates a recovery process definition file. The recovery process definition file is generated based on the non-executable process definition file that was determined in step S5 not to be executable.

FIGS. 6A and 6B illustrate a generation processing flow of a recovery process definition file according to the first exemplary embodiment of the present invention. This processing flow illustrates in detail the generation processing of the recovery process definition file performed in step S7 of FIG. 5. Each of the processes illustrated by this processing flow is realized by the CPU 101 of the MFP 1 executing a control program. Further, in FIGS. 6A and 6B, the process definition file (F1) illustrated in FIG. 4A is used as an example of the process definition file serving as the generation source of the recovery process definition file. First, in step S71, the process definition file processing unit 202 checks for the existence of input image data, specifically, the image data defined as a read processing target for the process definition file (F1). More specifically, the process definition file processing unit 202 determines whether input image data is being managed by the image data file management unit 203.

If the process definition file processing unit 202 determines that input image data does not exist (NO in step S72), the processing proceeds to step S6. If the process definition file processing unit 202 determines that one or more input image data exists (YES in step S72), the processing proceeds to step S73. In step S73, the process definition file processing unit 202 determines whether the existing image data can be combined based on the defined contents of the process definition file. For example, in the process definition file (F1) illustrated in FIG. 4A, the fact that the image data specified by the tags 306, 307, and 308 is to be combined is defined by the tag 309. Further, combining the image data is defined as being performed in the order of the image data specified by the tag 306, the image data specified by the tag 307, and the image data specified by the tag 308. Therefore, in this example, when two or more pieces of image data in a consecutive order exist, the process definition file processing unit 202 determines that image data can be combined (YES in step S73).

The process definition file processing unit 202 may determine that image data cannot be combined (NO in step S73) for a variety of reasons. For example, if only one piece of image data exists, the process definition file processing unit 202 determines that image data cannot be combined (NO in step S73). Further, for example, if the image data specified by the tag 307 does not exist, since combining in the specified order cannot be performed, the process definition file processing unit 202 determines that image data cannot be combined. If the process definition file processing unit 202 determines that image data cannot be combined (NO in step S73), the processing proceeds to step S75.

On the other hand, for example, if the image data specified by the tag 306 does not exist, the process definition file processing unit 202 determines that the remaining two files, specifically, the image data specified by the tags 307 and 308, can be combined (YES in step S73). Further, for example, if the image data specified by the tag 308 does not exist, the process definition file processing unit 202 also determines that the image data specified by the tags 306 and 307 can be combined (YES in step S73).

If the process definition file processing unit 202 determines that the image data can be combined (YES in step S73), then in step S74, based on the process definition file (F1), the process definition file processing unit 202 combines the existing image data. For example, if the image data specified by the tag 308 does not exist, the process definition file processing unit 202 combines the image data specified by the tag 306 and the image data specified by the tag 307. The image data combined in step S74 is later used as the input image data for the recovery process definition files generated in steps S75, S76, S78, S80, and S81. By combining image data that can be combined in advance in step S74, the processing performed when executing the recovery process definition files is reduced. In addition, the execution time of the recovery processing, specifically the processing substituting for the series of processes that originally was the execution target, can be reduced.

Next, in step S75, the process definition file processing unit 202 generates a recovery process definition file (F2) using only existing image data as input data. In this example, the recovery process definition file (F2) is generated when the image data specified by the tag 308 of the process definition file (F1) illustrated in FIG. 4A does not exist.

FIG. 7A illustrates an example of a recovery process definition file generated in step S75 of FIG. 6A. A tag 401 in the recovery process definition file (F2) defines the fact that this file is a process definition file. The following attributes are defined as attributes of the tag 401. For example, a process ID ("F2" in FIG. 7A) that uniquely identifies the recovery process definition file (F2), the fact that this file is a process definition file displayed on the operation unit 12 (type="display"), and the name of the process ("print meeting materials (only materials 1 and 2)" in FIG. 7A) are defined. In addition, the description "recovery="F1"" in the recovery process definition file (F2) indicates the fact that the recovery process definition file (F2) is a recovery process definition file generated based on the process definition file (F1).

A workflow tag 402 defines the workflow executed by the recovery process definition file. A tag 403 defines a process for reading the image data as input data. A subelement of the tag 403 defines the file path (dirX/MATERIALS1_2.img) of the actually read image data. A tag 404 defines the process for printing the image data. A subelement of the tag 404 defines the image data that is the printing target, specifically, the image data combined in step S74. The other subelements of the tag 404 are similar to the subelements in the process definition file (F1).

FIG. 7B illustrates an example of a workflow defined by the workflow tag 402 of the recovery process definition file (F2). This tag defines a workflow of reading the image data combined in step S74 of FIG. 6A (tag 403), and printing the read image data (tag 404).

Returning to FIG. 6A, in step S76, the process definition file processing unit 202 generates a recovery process definition file (F3) in which processing using specified substitute image data substituting for nonexistent input data as input data is defined.

FIG. 8A illustrates an example of the recovery process definition file (F3) generated in step S76 of FIG. 6A. A tag 501 defines the fact that this file is a process definition file. The following attributes are defined as attributes of the tag 501. For example, a process ID ("F3" in FIG. 8A) that uniquely identifies this file, the fact that this file is a process definition file displayed on the operation unit 12 (type="display"), and the name of the process ("print meeting materials (select material 3)" in FIG. 8A) are defined. In addition, the description "recovery="F1"" indicates the fact that this file is a recovery process definition file generated based on the process definition file (F1).

A workflow tag 502 defines the workflow executed by the recovery process definition file (F3). A tag 503 defines the processing for displaying on the operation unit 12 a dialog box that allows the user to specify the image data for input. A subelement of the tag 503 defines the directory that is initially displayed in the dialog box. A tag 504 defines the processing for combining the image data. A subelement of the tag 504 defines the image data to be a combination target. In the example of FIG. 8A, the fact that the image data read by the tag 403 and the image data specified by the user with the dialog box in tag 503 are to be combined is defined. A tag 505 defines the processing for printing the image data. A subelement of the tag 505 defines the image data to be a printing target, specifically, the image data combined in the tag 504. The other subelements of the tag 505 are similar to the subelements in the process definition file (F1).

FIG. 8B illustrates an example of a workflow defined by the workflow tag 502 of the recovery process definition file (F3). This tag defines a workflow of reading the image data combined in step S74 of FIG. 6A (tag 403) and the image data specified by the user (tag 503), combining the read image data (tag 504), and printing the combined image data (tag 505).

Returning to FIG. 6A, the process definition file processing unit 202 acquires scanner state information managed by the scanner state information management unit 204 from the scanner state information management unit 204. Then, in step S77, the process definition file processing unit 202 determines whether the scanner 14 is in a usable state based on the acquired scanner state information. If the process definition file processing unit 202 determines that the scanner 14 is not in a usable state (NO in step S77), the processing proceeds to step S79. If the process definition file processing unit 202 determines that the scanner 14 is in a usable state (YES in step S77), the processing proceeds to step S78. In step S78, the process definition file processing unit 202 generates a recovery process definition file (F4) in which processing for document scanning of substitute image data substituting for nonexistent image data is defined.

FIG. 9A illustrates an example of the recovery process definition file (F4) generated in step S78 of FIG. 6A. A tag 601 defines the fact that this file is a process definition file. The following attributes are defined as attributes of the tag 601. For example, a process ID ("F4" in FIG. 9A) that uniquely identifies this file, the fact that this file is a process definition file displayed on the operation unit 12 (type="display"), and the name of the process ("print meeting materials (scan material 3)" in FIG. 9A) are defined. In addition, the description "recovery="F1"" indicates the fact that this file is a recovery process definition file generated based on the process definition file (F1).

A workflow tag 602 defines the workflow executed by the recovery process definition file (F4). A tag 603 defines the processing for document scanning the image data for input. A subelement of the tag 603 defines color scanning as the setting for document scanning. A tag 604 defines the processing for combining the image data. A subelement of the tag 604 defines the image data to be a combination target. In the example of FIG. 9A, the fact that the image data read by the tag 403 and the image data document-scanned in the tag 603 are to be combined is defined. A tag 605 defines the processing for printing the image data. A subelement of the tag 605 defines the image data to be a printing target, specifically, the image data combined in the tag 604. The other subelements of the tag 605 are similar to the subelements in the process definition file (F1).

FIG. 9B illustrates an example of a workflow defined by the workflow tag 602 of the recovery process definition file (F4). This tag defines a workflow of reading the image data combined in step S74 of FIG. 6A (tag 403) and the document-scanned image data (tag 603), combining the read image data (tag 604), and printing the combined image data (tag 605).

In FIG. 6B, in step S79, the process definition file processing unit 202 determines whether substitute image data already managed by the substitute image data management unit 205 exists. If the process definition file processing unit 202 determines that substitute image data does not exist (NO in step S79), the processing proceeds to step S81. If the process definition file processing unit 202 determines that substitute image data does exist (YES in step S79), the process definition file processing unit 202 acquires this substitute image data from the 205. Then, in step S80, the process definition file processing unit 202 generates a recovery process definition file (F5) in which processing using the acquired substitute image data as input data is defined.

FIG. 10A illustrates an example of the recovery process definition file (F5) generated in step S80 of FIG. 6B. A tag 701 defines the fact that this file is a process definition file. The following attributes are defined as attributes of the tag 701. For example, a process ID ("F5" in FIG. 10A) that uniquely identifies this file, the fact that this file is a process definition file displayed on the operation unit 12 (type="display"), and the name of the process ("print meeting materials (material 3 is substitute image)" in FIG. 10A) are defined. In addition, the description "recovery="F1"" indicates the fact that this file is a recovery process definition file generated based on the process definition file (F1).

A workflow tag 702 defines the workflow executed by the recovery process definition file (F5). A tag 703 defines the processing for reading the image data as image data. A subelement of the tag 703 specifies the file path (dirC/SUBSTITUTE IMAGE DATA.img) of the substitute image data acquired by the process definition file processing unit 202 from the substitute image data management unit 205. A tag 704 defines the processing for combining the image data. A subelement of the tag 704 defines the image data to be a combination target. In the example of FIG. 10A, the fact that the image data read by the tag 403 and the substitute image data read by the tag 703 are to be combined is defined. A tag 705 defines the processing for printing the image data. A subelement of the tag 705 defines the image data to be a printing target, specifically, the image data combined in the tag 704. The other subelements of the tag 705 are similar to the subelements in the process definition file (F1).

FIG. 10B illustrates an example of a workflow defined by the workflow tag 702 of the recovery process definition file (F5). This tag defines a workflow of reading the image data combined in step S74 of FIG. 6A (tag 403) and the substitute image data (tag 703), combining the read image data (tag 704), and printing the combined image data (tag 705).

Returning to FIG. 6B, in step S81, the process definition file processing unit 202 generates a recovery process definition file (F6) in which nonexistent image data is directly input. The recovery process definition file (F6) is a process definition file for executing processing in which the process definition file (F1) redefines image data that did not exist at the specified execution date and time but was then subsequently stored by the user in a hot folder.

FIG. 11A illustrates an example of the recovery process definition file (F6) generated in step S81 of FIG. 6B. A tag 801 defines the fact that this file is a process definition file. The following attributes are defined as attributes of the tag 801. For example, a process ID ("F6" in FIG. 11A) that uniquely identifies this file, the fact that this file is a process definition file displayed on the operation unit 12 (type="display"), and the name of the process ("print meeting materials (prepare material 3)" in FIG. 11A) are defined. In addition, the description "recovery='F1'" indicates the fact that this file is a recovery process definition file generated based on the process definition file (F1).

A workflow tag 802 defines the workflow executed by the recovery process definition file (F6). A subelement 308 of a tag 802 has the same definition as the tag 308 in the process definition file (F1). A tag 803 defines the processing for combining the image data. A subelement of the tag 803 defines the image data to be a combination target. In the example of FIG. 11A, the fact that the image data read by the tag 403 and the image data read by the tag 308 are to be combined is defined. A tag 804 defines the processing for printing the image data. A subelement of the tag 804 defines the image data to be a printing target, specifically, the image data combined in the tag 803. The other subelements of the tag 804 are similar to the subelements in the process definition file (F1).

FIG. 11B illustrates an example of a workflow defined by the workflow tag 802 of the recovery process definition file (F6). This tag defines a workflow of reading the image data combined in step S74 of FIG. 6A (tag 403) and the image data (tag 308), combining the read image data (tag 803), and printing the combined image data (tag 804).

Returning to FIG. 6B, in step S82, the process definition file processing unit 202 registers the recovery process definition files generated in steps S75, S76, S78, S80, and S81 in the process definition file management unit 201.

Figure 12:
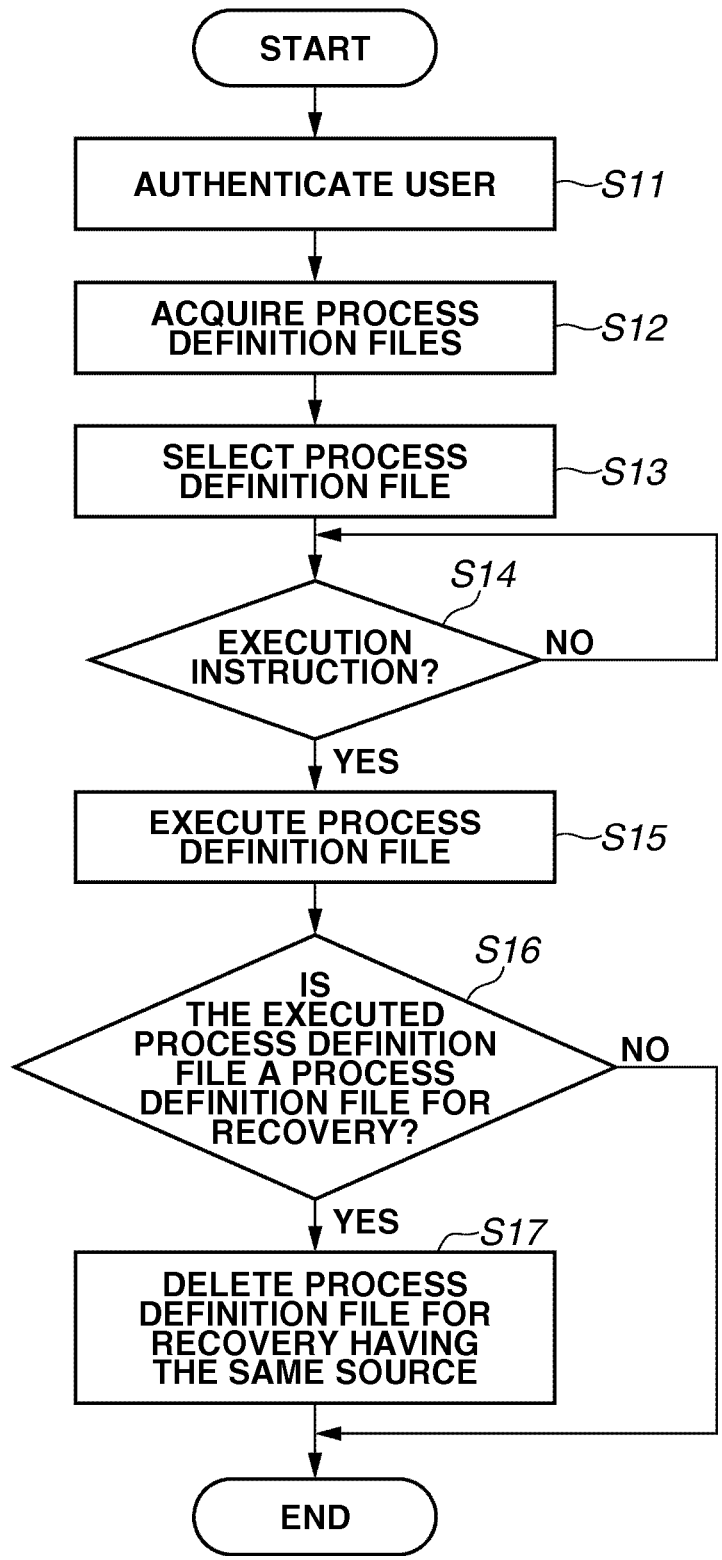
FIG. 12 illustrates an example of an execution processing flow of a recovery process definition file.

FIG. 12 illustrates an example of an execution processing flow of a recovery process definition file according to the first exemplary embodiment of the present invention. The CPU 101 of the MFP 1 executing a control program realizes each of the processes illustrated by processing flow in FIG. 12.

First, in step S11, the user authentication management unit 206 included in the MFP 1 authenticates the user operating the MFP 1. More specifically, the operation unit 12 displays an authentication information input screen for inputting authentication information. When the user inputs authentication information via the authentication information input screen, the user authentication management unit 206 authenticates the user based on a verification result between the input authentication information and pre-held authentication information. An arbitrary authentication method may be used for authenticating the user, such as a method that reads an ID card and inputs authentication information, or an authentication method that uses biological information.

After user authentication has been successfully performed, then in step S12, the process definition file processing unit 202 acquires from the process definition file management unit 201 the process definition files managed by the process definition file management unit 201. The process definition files managed by the process definition file management unit 201 include normal process definition files and recovery process definition files. The process definition file processing unit 202 instructs the operation unit 12 to display a process definition file selection screen, which is a screen for selecting the process definition files acquired in step S12. If multiple process definition files are acquired, the operation unit 12 displays these process definition files in a list on the process definition file selection screen. Consequently, the recovery process definition files are provided to the user selectively. The operation unit 12 may display the normal process definition files and the recovery process definition files by changing the display format (color, shape, font, etc.) to differentiate between the normal process definition files and the recovery process definition files. Further, a mode may be prepared in which only the recovery process definition files are displayed. The operation unit 12 may display recovery process definition files generated based on the same process definition file in groups. In step S13, the process definition file processing unit 202 selects a process definition file based on an operation input from the user via the process definition file selection screen.

Next, in step S14, the process definition file processing unit 202 determines whether a process definition file execution instruction has been received. In step S14, the determination is made based on whether the "execute" button on the process definition file selection screen has been pressed by the user. If the "execute" button has been pressed, the process definition file processing unit 202 determines that a process definition file execution instruction has been received (YES in step S14), and the processing proceeds to step S15. If the "execute" button has not been pressed (NO in step S14), the process definition file processing unit 202 waits until the "execute" button is pressed.

In step S15, the process definition file processing unit 202 executes the process definition file based on the instructions described in the workflow tag of the process definition file. For example, using the recovery process definition file (F2) illustrated in FIG. 7A as an example, the process definition file processing unit 202 performs the series of processes of reading the image data and printing the read image data.

Next, in step S16, the process definition file processing unit 202 determines whether the process definition file executed in step S15 is a recovery process definition file. For example, using the recovery process definition file (F2) illustrated in FIG. 7A as an example, the process definition file processing unit 202 determines whether the executed file is a recovery process definition file based on the description "recovery='F1'" in the tag 401.

If the process definition file processing unit 202 determines that the executed process definition file is a recovery process definition file (YES in step S16), the processing proceeds to step S17. If the process definition file processing unit 202 determines that the executed process definition file is not a recovery process definition file (NO in step S16), the process definition file processing unit 202 finishes the processing.

In step S17, the process definition file processing unit 202 deletes recovery process definition files having the same source as the executed recovery process definition file. Recovery process definition files having the same source are recovery process definition files whose generation source process definition file is similar to the executed recovery process definition file. More specifically, the process definition file processing unit 202 deletes the recovery process definition files having the same recovery attribute in the process tag as the executed recovery process definition file. The process definition file management unit 201 removes the deleted process definition files from its own management.

According to the recovery process definition file generation processing of the first exemplary embodiment, when a process definition file associated with a hot folder is not executed at a specified execution date and time, multiple recovery process definition files are generated. Since the user can select and execute a desired recovery process definition file to be executed from among the generated recovery process definition files, user convenience is improved.

Next, a second exemplary embodiment according to the present invention will be described. In the above first exemplary embodiment, when a process definition file is not executed at a specified execution date and time, the process definition file processing unit 202 generates recovery process definition files. Then, the operation unit 12 displays the recovery process definition files on a screen (process definition file selection screen) in a selectable manner. Therefore, to execute a recovery process definition file, the user has to go to the place where the MFP 1 is installed, and select the recovery process definition file via the operation unit 12.

In the second exemplary embodiment, when a process definition file is not executed at a specified execution date and time, the process definition file processing unit 202 generates recovery hot folders and recovery process definition files associated with the recovery hot folders. The recovery hot folders are hot folders in which recovery process definition files that are associated with a hot folder are executed based on storage of an arbitrary file acting as a trigger. The recovery hot folder is a hot folder for recovery that can be executed from an external apparatus such as the user PC 3.

Figure 13:
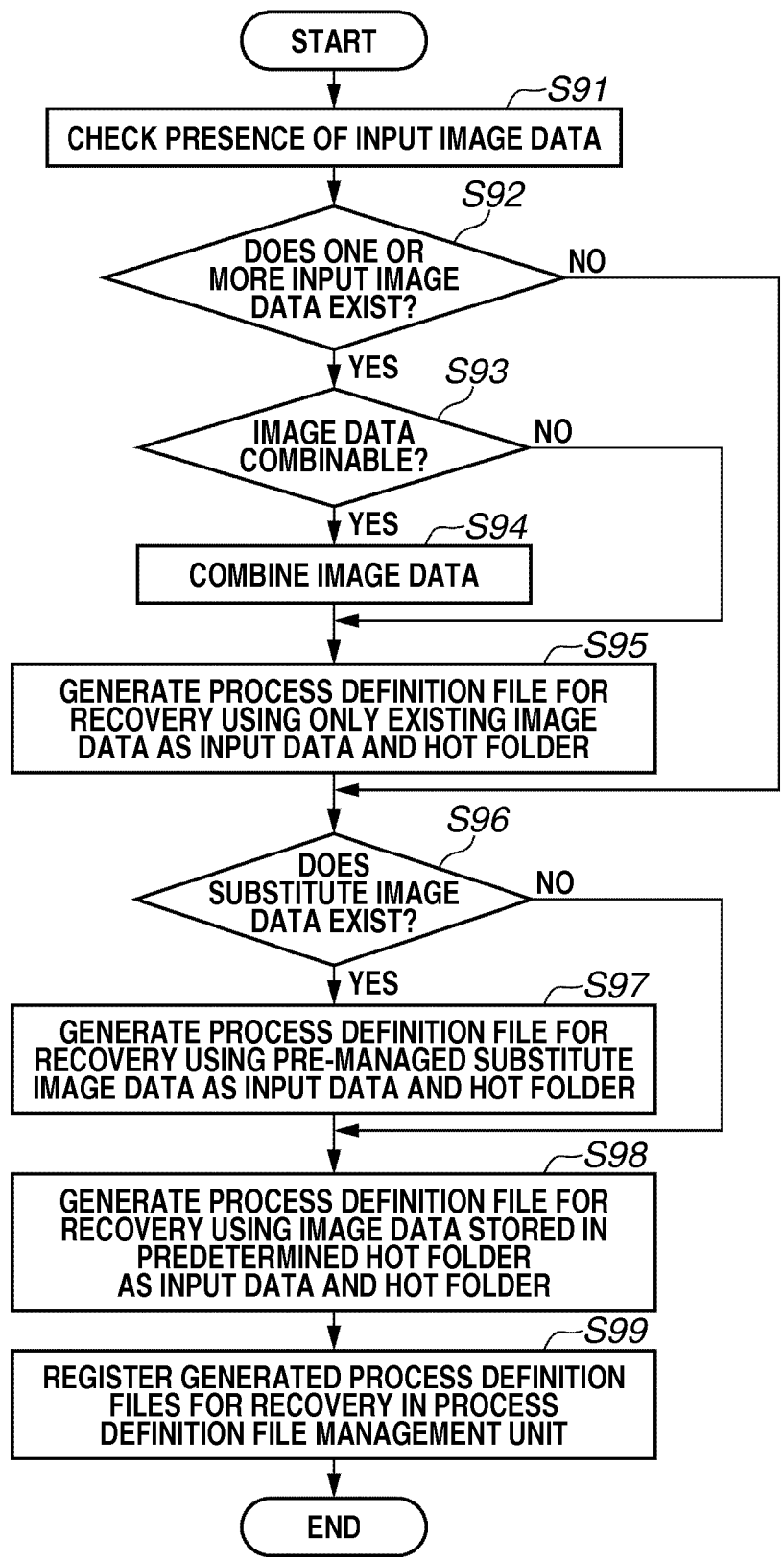
FIG. 13 illustrates a generation processing flow of a recovery process definition file.

FIG. 13 illustrates a generation processing flow of a recovery process definition file according to the second exemplary embodiment of the present invention. This processing flow corresponds to the recovery process definition file generation processing performed in step S7 of FIG. 5. In FIG. 13, the process definition file (F1) illustrated in FIG. 4A is used as an example of the process definition file serving as the generation source of the recovery process definition file. Further, the processing performed in steps S91, S92, S93, S94, and S96 in FIG. 13 is similar to the processing performed in steps S71, S72, S73, S74, and S79 of FIGS. 6A and 6B, and thus a description of the processing performed in these steps is not repeated here.

In step S95 of FIG. 13, the process definition file processing unit 202 generates a recovery process definition file using only existing image data as input data, and a hot folder associated with the recovery process definition file. In the generated recovery process definition file, processing using only existing image data as input data is defined.

FIG. 14A illustrates an example of the recovery process definition file generated in step S95 of FIG. 13. In this example, a recovery process definition file (F7) is generated when the image data specified by the tag 308 of the process definition file (F1) illustrated in FIG. 4A does not exist.

A tag 901 defines the fact that this file is a process definition file. The following attributes are defined as attributes of the tag 901. For example, a process ID ("F7" in FIG. 14A) that uniquely identifies the process definition file, the fact that this file is a process definition file associated with a hot folder (type="hot folder"), and the name of the process ("print meeting materials (only materials 1 and 2) in FIG. 14A) are defined. In addition, the description "recovery="F1"" indicates the fact that this file is a recovery process definition file generated based on the process definition file (F1).

A condition tag 902 defines the execution condition of the recovery process definition file. A tag 903, which is a subelement of the condition tag 902, defines a specific trigger for executing the process definition file. The description "dir A/print meeting materials (only materials 1 and 2)/*" defines the fact that this file is executed when an arbitrary file is stored in the folder called "dirA/PRINT MEETING MATERIALS (ONLY MATERIALS 1 AND 2)". The folder "dirA/PRINT MEETING MATERIALS (ONLY MATERIALS 1 AND 2)" is the hot folder generated in step S95 of FIG. 13. The file stored in this hot folder is used only as an execution trigger, and is not used in the actual execution processing of the recovery process definition file.

FIG. 14B illustrates a workflow defined by the workflow tag 402 of the recovery process definition file (F7). This tag defines a workflow of reading the image data combined in step S94 of FIG. 13A (tag 403), and printing the read image data (tag 404).

Returning to FIG. 13, in step S97, the process definition file processing unit 202 generates a recovery process definition file using pre-managed substitute image data as input data, and a recovery hot folder associated with the process definition file. In the generated recovery process definition file, processing using substitute image data instead of nonexistent image data is defined.

FIG. 15A illustrates an example of a recovery process definition file generated in step S97 of FIG. 13. In this example, a recovery process definition file (F8) is generated when the image data specified by the tag 308 of the process definition file (F1) illustrated in FIG. 4A does not exist. A tag 1001 defines the fact that this file is a process definition file. The following attributes are defined as attributes of the tag 1001. For example, a process ID ("F8" in FIG. 15A) that uniquely identifies this file, the fact that this file is a process definition file associated with a hot folder (type="hot folder"), and the name of the process ("print meeting materials (material 3 is a substitute image) in FIG. 15A) are defined. In addition, the description "recovery="F1"" indicates the fact that this file is a recovery process definition file generated based on the process definition file (F1). A condition tag 1002 defines the execution condition of the recovery process definition file (F8). A tag 1003, which is a subelement of the condition tag 1002, defines a specific trigger for executing this file. The description "dirA/PRINT MEETING MATERIALS (MATERIAL 3 IS A SUBSTITUTE IMAGE)/*" defines the fact that this file is executed if an arbitrary file is stored in the recovery hot folder called "dirA/PRINT MEETING MATERIALS (MATERIAL 3 IS A SUBSTITUTE IMAGE)". This recovery hot folder is the hot folder generated in step S97 of FIG. 13.

FIG. 15B illustrates a workflow defined by the workflow tag 702 of the recovery process definition file (F8). The definition of the workflow tag 702 is similar to that of the workflow tag 702 in FIG. 10B. This tag defines a workflow of reading the image data combined in step S94 of FIG. 13A (tag 403) and the substitute image data (tag 703), combining the read image data (tag 704), and printing the combined image data (tag 705).

Returning to FIG. 13, in step S98, the process definition file processing unit 202 generates a recovery process definition file using image data stored in a predetermined hot folder as input data, and a recovery hot folder associated with this definition file. In the generated recovery process definition file, processing using image data stored in the recovery hot folder instead of nonexistent image data is defined.

FIG. 16A illustrates an example of a recovery process definition file generated in step S98 of FIG. 13. In this example, a recovery process definition file (F9) is illustrated that is generated when the image data specified by the tag 308 of the process definition file (F1) illustrated in FIG. 4A does not exist.

A tag 1101 defines the fact that this file is a process definition file. The following attributes are defined as attributes of the tag 1101. For example, a process ID ("F9" in FIG. 16A) that uniquely identifies the process definition file, the fact that this file is a process definition file associated with a hot folder (type="hot folder"), and the name of the process ("print meeting materials (store material 3 in hot folder) in FIG. 14A) are defined. In addition, the description "recovery="F1"" indicates the fact that this file is a recovery process definition file generated based on the process definition file (F1). A condition tag 1102 defines the execution condition of this file. A tag 1103, which is a subelement of the condition tag 1102, defines a specific trigger for executing this file. The description "dirA/PRINT MEETING MATERIALS (PLEASE STORE MATERIAL 3 IN HOT FOLDER)/*.img" defines the fact that this process definition file is executed if an arbitrary file is stored in the recovery hot folder. This recovery hot folder is the hot folder generated in step S98 of FIG. 13. The description "dirA/PRINT MEETING MATERIALS (PLEASE STORE MATERIAL 3 IN HOT FOLDER)/*.img" indicates this recovery hot folder.

A tag 1104 defines each process executed by this file. A tag 1105 defines the processing for reading the image data as input data. A subelement of the tag 1105 specifies the image data stored in the hot folder generated in step S98 of FIG. 13. A tag 1106 defines the processing for combining the image data. A subelement of the tag 1106 defines the image data to be a combination target. In this example, it is defined that the image data read by tag 403 and the image data read by tag 1105 are to be combined. A tag 1107 defines the processing for printing the image data. A subelement of the tag 1107 defines the image data that is the printing target (the image data combined by tag 1106). The other subelements of the tag 1107 are similar to in the process definition file (F1), which is the generation source.

FIG. 16B illustrates a workflow defined by the workflow tag 1104 of the recovery process definition file (F9). This workflow defined by this tag includes the following processing. Specifically, this workflow includes processing for reading the image data combined in step S94 of FIG. 13A (tag 403) and the image data stored in the recovery hot folder (tag 1105). Further, this workflow includes processing for combining the read image data (tag 1106), and processing for printing the combined image data (tag 1107).

Returning to FIG. 13, in step S99, the process definition file processing unit 202 registers the recovery process definition files generated in steps S95, S97, and S99 of FIG. 13 in the process definition file management unit 201.

In addition to the processing illustrated by the processing flow of FIG. 13, the process definition file processing unit 202 also may execute the following processing. Specifically, the process definition file processing unit 202 can generate a recovery process definition file in which processing using specified substitute image data as input data is defined, and a recovery hot folder associated with this file. Further, the process definition file processing unit 202 can generate a recovery process definition file in which processing for document scanning substitute image data is defined, and a recovery hot folder associated with this file. Moreover, the process definition file processing unit 202 can generate a recovery process definition file in which non-existent image data is directly input, and a recovery hot folder associated with this file.

Figure 17:
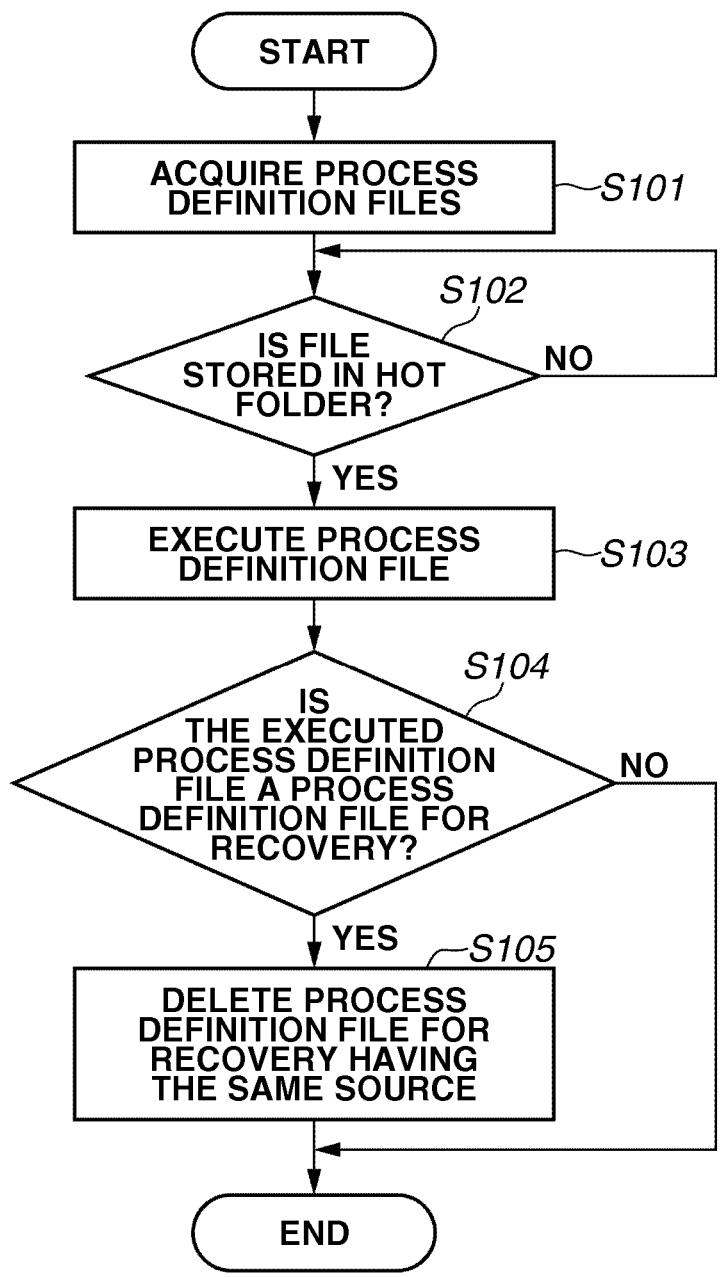
FIG. 17 illustrates an example of an execution processing flow of a recovery process definition file.

FIG. 17 illustrates an example of an execution processing flow of a recovery process definition file according to the second exemplary embodiment of the present invention. The processing performed in steps S101, S104, and S105 in FIG. 17 is similar to the processing performed in steps S12, S16, and S17 of FIG. 12, and thus a description of the processing performed in these steps is not repeated here.

In step S102 of FIG. 17, the process definition file processing unit 202 determines whether the file specified by the execution condition of the process definition file is stored in the hot folder. If the process definition file processing unit 202 determines that the file specified by the execution condition is stored in the hot folder (YES in step S102), the processing proceeds to step S103. If the process definition file processing unit 202 determines that the file specified by the execution condition is not stored (NO in step S102), the process definition file processing unit 202 waits until the file is stored. In step S103, the process definition file processing unit 202 executes processing based on the definition described in the workflow tag of the process definition file. Using the process definition file (F7) illustrated in FIG. 14A as an example, the process definition file processing unit 202 executes the series of processes of reading the image data and printing the read image data.

According to the second exemplary embodiment, when a process definition file associated with a hot folder is not executed at an execution date and time, recovery hot folders and recovery process definition files associated with the recovery hot folders are generated. Since the user can use a desired recovery hot folder from among the recovery hot folders, user convenience is improved. Further, according to the second exemplary embodiment, when the user stores an arbitrary file in the recovery hot folder, this triggers execution of the recovery process definition file associated with that hot folder. Consequently, the user can perform recovery at an external apparatus (e.g., the user PC 3) without going to the place where the MFP 1 is installed.

Aspects of the present invention can be realized by a computer of a system or apparatus (or devices such as a CPU or microprocessor unit (MPU)) that reads out and executes a program recorded on a memory device to perform the functions of the above-described embodiment(s). Aspects of the present invention also can be realized by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-181180 filed Aug. 4, 2009, which is hereby incorporated by reference herein in its entirety.

What is claimed is:

1. An information processing apparatus, comprising:
an execution determination unit configured to determine whether a series of processes including a plurality of processes is executable at an execution time of the series of processes; and
a control unit configured to selectively provide, in response to the execution determination unit determining that the series of processes is not executable, a plurality of recovery processes for substituting for the series of processes based on the series of processes,
wherein an execution condition of the series of processes is included in a definition file defining the series of processes associated with a predetermined event, and wherein, in response to the predetermined event occurring, the execution determination unit is configured to determine whether the execution condition is satisfied, wherein, in response to the execution determination unit determining that the execution condition is not satisfied, the control unit is configured to generate, based on the definition file, at least one substitute file defining substitute processing to substitute for the series of processes defined by the definition file, wherein, in response to the execution determination unit determining that the execution condition is not satisfied, the control unit is configured to generate, based on the definition file, a folder associated with the at least one substitute file, and wherein storage of an arbitrary file in the folder associated with the at least one substitute file is defined in the at least one substitute file as a trigger for execution of the substitute processing defined by the at least one substitute file.

2. The information processing apparatus according to claim 1, wherein occurrence of the predetermined event includes current date and time reaching a predetermined date and time.

3. An information processing apparatus, comprising:

an execution determination unit configured to determine whether a series of processes including a plurality of processes is executable at an execution time of the series of processes; and a control unit configured to selectively provide, in response to the execution determination unit determining that the series of processes is not executable, a plurality of recovery processes for substituting for the series of processes based on the series of processes, wherein an execution condition of the series of processes is included in a definition file defining the series of processes associated with a predetermined event, and wherein, in response to the predetermined event occurring, the execution determination unit is configured to determine whether the execution condition is satisfied, wherein, in response to the execution determination unit determining that the execution condition is not satisfied, the control unit is configured to generate, based on the definition file, at least one substitute file defining substitute processing to substitute for the series of processes defined by the definition file, wherein the execution determination unit is configured to determine whether all image data required for execution of processing included in the definition file and defined by the definition file is stored in a storage unit, and wherein, in response to the execution determination unit determining that some of the image data is not stored in the storage unit, the control unit is configured to generate a substitute file in which processing using only image data stored in the storage unit as input data is defined.

4. The information processing apparatus according to claim 3, wherein occurrence of the predetermined event includes current date and time reaching a predetermined date and time.

5. An information processing apparatus, comprising:

an execution determination unit configured to determine whether a series of processes including a plurality of processes is executable at an execution time of the series of processes; and a control unit configured to selectively provide, in response to the execution determination unit determining that the series of processes is not executable, a plurality of recovery processes for substituting for the series of processes based on the series of processes, wherein an execution condition of the series of processes is included in a definition file defining the series of processes associated with a predetermined event, and wherein, in response to the predetermined event occurring, the execution determination unit is configured to determine whether the execution condition is satisfied, wherein, in response to the execution determination unit determining that the execution condition is not satisfied, the control unit is configured to generate, based on the definition file, at least one substitute file defining substitute processing to substitute for the series of processes defined by the definition file, wherein the execution determination unit is configured to determine whether all image data required for execution of processing included in the definition file and defined by the definition file is stored in a storage unit, and wherein, in response to the execution determination unit determining that some of the image data is not stored in the storage unit, the control unit is configured to generate a substitute file in which processing using substitute image data substituting for image data not stored in the storage unit as input data is defined.

6. The information processing apparatus according to claim 5, wherein occurrence of the predetermined event includes current date and time reaching a predetermined date and time.

7. An information processing apparatus, comprising:

an execution determination unit configured to determine whether a series of processes including a plurality of processes is executable at an execution time of the series of processes; and a control unit configured to selectively provide, in response to the execution determination unit determining that the series of processes is not executable, a plurality of recovery processes for substituting for the series of processes based on the series of processes, wherein an execution condition of the series of processes is included in a definition file defining the series of processes associated with a predetermined event, and wherein, in response to the predetermined event occurring, the execution determination unit is configured to determine whether the execution condition is satisfied, wherein, in response to the execution determination unit determining that the execution condition is not satisfied, the control unit is configured to generate, based on the definition file, at least one substitute file defining substitute processing to substitute for the series of processes defined by the definition file, wherein the execution determination unit is configured to determine whether all image data required for execution of processing included in the definition file and defined by the definition file is stored in a storage unit, and wherein, in response to the execution determination unit determining that some of the image data is not stored in the storage unit, the control unit is configured to generate a substitute file defining processing for document-scanning substitute image data substituting for image data not stored in the storage unit.

8. The information processing apparatus according to claim 7, wherein occurrence of the predetermined event includes current date and time reaching a predetermined date and time.

9. An information processing apparatus, comprising:
an execution determination unit configured to determine whether a series of processes including a plurality of processes is executable at an execution time of the series of processes; and
a control unit configured to selectively provide, in response to the execution determination unit determining that the series of processes is not executable, a plurality of recovery processes for substituting for the series of processes based on the series of processes,
wherein an execution condition of the series of processes is included in a definition file defining the series of processes associated with a predetermined event, and
wherein, in response to the predetermined event occurring, the execution determination unit is configured to determine whether the execution condition is satisfied,
wherein, in response to the execution determination unit determining that the execution condition is not satisfied, the control unit is configured to generate, based on the definition file, at least one substitute file defining substitute processing to substitute for the series of processes defined by the definition file,
wherein the execution determination unit is configured to determine whether all image data required for execution of processing included in the definition file and defined by the definition file is stored in a storage unit, and
wherein, in response to the execution determination unit determining that some of the image data is not stored in the storage unit, the control unit is configured to generate a substitute file defining image data not stored in the storage unit as input data to be used in executing processing.

10. The information processing apparatus according to claim 9, wherein occurrence of the predetermined event includes current date and time reaching a predetermined date and time.

11. A method for controlling an information processing apparatus, the method comprising:
determining whether a series of processes including a plurality of processes is executable at an execution time of the series of processes; and
selectively providing, in response to determining that the series of processes is not executable, a plurality of recovery processes for substituting for the series of processes based on the series of processes,
wherein an execution condition of the series of processes is included in a definition file defining the series of processes associated with a predetermined event, and
wherein, in response to the predetermined event occurring, determining includes determining whether the execution condition is satisfied,
wherein, in response to determining that the execution condition is not satisfied, selectively providing includes generating, based on the definition file, at least one substitute file defining substitute processing to substitute for the series of processes defined by the definition file,
wherein, in response to determining that the execution condition is not satisfied, selectively providing includes generating, based on the definition file, a folder associated with the at least one substitute file, and
wherein storage of an arbitrary file in the folder associated with the at least one substitute file is defined in the at least one substitute file as a trigger for execution of the substitute processing defined by the at least one substitute file.

12. A non-transitory computer-readable storage medium storing a program that causes an information processing apparatus to perform the method according to claim 11.

13. A method for controlling an information processing apparatus, the method comprising:
determining whether a series of processes including a plurality of processes is executable at an execution time of the series of processes; and
selectively providing, in response to determining that the series of processes is not executable, a plurality of recovery processes for substituting for the series of processes based on the series of processes,
wherein an execution condition of the series of processes is included in a definition file defining the series of processes associated with a predetermined event, and
wherein, in response to the predetermined event occurring, determining includes determining whether the execution condition is satisfied,
wherein, in response to determining that the execution condition is not satisfied, selectively providing includes generating, based on the definition file, at least one substitute file defining substitute processing to substitute for the series of processes defined by the definition file,
wherein determining includes determining whether all image data required for execution of processing included in the definition file and defined by the definition file is stored, and
wherein, in response to determining that some of the image data is not stored, selectively providing includes generating a substitute file in which processing using only image data stored as input data is defined.

14. A non-transitory computer-readable storage medium storing a program that causes an information processing apparatus to perform the method according to claim 13.

15. A method for controlling an information processing apparatus, the method comprising:
determining whether a series of processes including a plurality of processes is executable at an execution time of the series of processes; and
selectively providing, in response to determining that the series of processes is not executable, a plurality of recovery processes for substituting for the series of processes based on the series of processes,
wherein an execution condition of the series of processes is included in a definition file defining the series of processes associated with a predetermined event, and
wherein, in response to the predetermined event occurring, determining includes determining whether the execution condition is satisfied,
wherein, in response to determining that the execution condition is not satisfied, selectively providing includes generating, based on the definition file, at least one substitute file defining substitute processing to substitute for the series of processes defined by the definition file,
wherein determining includes determining whether all image data required for execution of processing included in the definition file and defined by the definition file is stored, and
wherein, in response to determining that some of the image data is not stored, selectively providing includes generating a substitute file in which processing using substitute image data substituting for image data not stored as input data is defined.

16. A non-transitory computer-readable storage medium storing a program that causes an information processing apparatus to perform the method according to claim 15.

17. A method for controlling an information processing apparatus, the method comprising:
- determining whether a series of processes including a plurality of processes is executable at an execution time of the series of processes; and
- selectively providing, in response to determining that the series of processes is not executable, a plurality of recovery processes for substituting for the series of processes based on the series of processes,
- wherein an execution condition of the series of processes is included in a definition file defining the series of processes associated with a predetermined event, and wherein, in response to the predetermined event occurring, determining includes determining whether the execution condition is satisfied,
- wherein, in response to determining that the execution condition is not satisfied, selectively providing includes generating, based on the definition file, at least one substitute file defining substitute processing to substitute for the series of processes defined by the definition file,
- wherein determining includes determining whether all image data required for execution of processing included in the definition file and defined by the definition file is stored, and
- wherein, in response to determining that some of the image data is not stored, selectively providing includes generating a substitute file defining processing for document-scanning substitute image data substituting for image data not stored.

18. A non-transitory computer-readable storage medium storing a program that causes an information processing apparatus to perform the method according to claim 17.

19. A method for controlling an information processing apparatus, the method comprising:
- determining whether a series of processes including a plurality of processes is executable at an execution time of the series of processes; and
- selectively providing, in response to determining that the series of processes is not executable, a plurality of recovery processes for substituting for the series of processes based on the series of processes,
- wherein an execution condition of the series of processes is included in a definition file defining the series of processes associated with a predetermined event, and wherein, in response to the predetermined event occurring, determining includes determining whether the execution condition is satisfied,
- wherein, in response to determining that the execution condition is not satisfied, selectively providing includes generating, based on the definition file, at least one substitute file defining substitute processing to substitute for the series of processes defined by the definition file,
- wherein determining includes determining whether all image data required for execution of processing included in the definition file and defined by the definition file is stored, and
- wherein, in response to determining that some of the image data is not stored, selectively providing includes generating a substitute file defining image data not stored as input data to be used in executing processing.

20. A non-transitory computer-readable storage medium storing a program that causes an information processing apparatus to perform the method according to claim 19.

* * * * *